United States Patent
Inoue et al.

(10) Patent No.: US 12,111,254 B2
(45) Date of Patent: Oct. 8, 2024

(54) SAMPLE ANALYZING APPARATUS

(71) Applicant: HORIBA, Ltd., Kyoto (JP)

(72) Inventors: Takahito Inoue, Kyoto (JP); Hiroshi Uchihara, Kyoto (JP); Kyoji Shibuya, Kyoto (JP)

(73) Assignee: HORIBA, LTD., Kyoto (JP)

( * ) Notice: Subject to any disclaimer, the term of this patent is extended or adjusted under 35 U.S.C. 154(b) by 466 days.

(21) Appl. No.: 17/611,471

(22) PCT Filed: May 12, 2020

(86) PCT No.: PCT/JP2020/018928
§ 371 (c)(1),
(2) Date: Nov. 15, 2021

(87) PCT Pub. No.: WO2020/230775
PCT Pub. Date: Nov. 19, 2020

(65) Prior Publication Data
US 2022/0244176 A1   Aug. 4, 2022

(30) Foreign Application Priority Data

May 15, 2019  (JP) ................. 2019-092441

(51) Int. Cl.
*G01N 21/39*  (2006.01)
*G01J 3/433*  (2006.01)
(Continued)

(52) U.S. Cl.
CPC ............ *G01N 21/39* (2013.01); *G01J 3/4338* (2013.01); *G01N 21/3504* (2013.01); *G01N 1/44* (2013.01);
(Continued)

(58) Field of Classification Search
CPC .... G01N 21/39; G01N 21/3504; G01J 3/4338
See application file for complete search history.

(56) References Cited

U.S. PATENT DOCUMENTS

| | | | |
|---|---|---|---|
| 5,984,998 A | 11/1999 | Ottesen et al. | |
| 6,326,620 B1 | 12/2001 | Willis | |

(Continued)

FOREIGN PATENT DOCUMENTS

| | | | |
|---|---|---|---|
| CN | 108458984 A | 8/2018 | |
| CN | 109490250 A | 3/2019 | |

(Continued)

OTHER PUBLICATIONS

European Patent Office, Examination Report dated Feb. 8, 2024, which was issued in connection with European Patent Application No. 20805409.8 (10 pages).

(Continued)

*Primary Examiner* — Chih-Cheng Kao
(74) *Attorney, Agent, or Firm* — LUCAS & MERCANTI, LLP

(57) ABSTRACT

A sample analyzing apparatus analyzes a component to be measured securely while reducing a frequency of maintenance of the sample analyzing apparatus. The sample analyzing apparatus includes a heating furnace that heats a sample held by a sample holding body and a gas analysis section that analyzes a component to be measured contained in a gas generated by heating the sample, and the gas analysis section includes a laser light source that irradiates the gas with a laser light, and a photodetector that detects an intensity of a sample light as being the laser light that has transmitted through the gas.

6 Claims, 16 Drawing Sheets

(51) Int. Cl.
  *G01N 1/44* (2006.01)
  *G01N 21/3504* (2014.01)
  *G01N 21/31* (2006.01)
  *G01N 21/3518* (2014.01)

(52) U.S. Cl.
  CPC . *G01N 2021/3129* (2013.01); *G01N 21/3518* (2013.01)

(56) References Cited

U.S. PATENT DOCUMENTS

| | | | |
|---|---|---|---|
| 2002/0152797 A1* | 10/2002 | McAndrew | G01N 21/39 73/23.2 |
| 2003/0082816 A1 | 5/2003 | Guerra | |
| 2004/0191712 A1 | 9/2004 | Thomson et al. | |
| 2014/0002823 A1 | 1/2014 | Nakatani et al. | |
| 2016/0231298 A1 | 8/2016 | Hirata | |
| 2017/0138846 A1* | 5/2017 | Alizadeh | G01N 21/3504 |
| 2018/0172581 A1 | 6/2018 | Shibuya et al. | |
| 2019/0113442 A1 | 4/2019 | Shibuya | |
| 2020/0210651 A1* | 7/2020 | Shibuya | G01N 21/3103 |

FOREIGN PATENT DOCUMENTS

| | | | |
|---|---|---|---|
| DE | 4216508 A | 11/1993 | |
| EP | 2118638 A1 | 11/2009 | |
| EP | 2118638 B1 | 5/2013 | |
| JP | H06-265475 A | 9/1994 | |
| JP | 2007-040995 A | 2/2007 | |
| JP | 2011-043461 A | 3/2011 | |
| JP | 2011-220758 A | 11/2011 | |
| JP | 2011-169753 A | 12/2011 | |
| JP | 2012-002799 A | 1/2012 | |
| JP | 2013-050403 A | 3/2013 | |
| JP | 2013-134236 A | 7/2013 | |
| JP | 2019-027867 A | 2/2019 | |
| WO | 2008/106056 A1 | 9/2008 | |
| WO | 2012/120957 A1 | 9/2012 | |
| WO | 2015/045869 A1 | 4/2015 | |
| WO | 2018/231065 A1 | 12/2018 | |

OTHER PUBLICATIONS

PCT, International Search Report for the corresponding application No. PCT/JP2020/018928, dated Jul. 28, 2020, with English translation.
European search report dated Dec. 14, 2022 issued in European Patent Application No. 20805409.8 (10 pages).
Japanese Patent Office, Notice of Reasons for Refusal dated Nov. 14, 2023, which was issued in connection with Japanese Patent Application No. 2021-519434 and its English translation (8 pages).
Japanese Patent Office, Notice of Reasons for Refusal dated Jan. 9, 2024, which was issued in connection with Japanese Patent Application No. 2021-519434 and its English translation (6 pages).

* cited by examiner

SAMPLE ANALYZING APPARATUS

CROSS REFERENCE TO RELATED APPLICATION

This Application is a 371 of PCT/JP2020/018928 filed on May 12, 2020, which, in turn, claimed the priority of Japanese Patent Application No. 2019-092441 filed on May 15, 2019, and both applications are incorporated herein by reference.

FIELD OF THE ART

The present invention relates to a sample analyzing apparatus for analyzing a component to be measured contained in a sample.

BACKGROUND ART

Conventionally as an analyzer for analyzing carbon (C) or sulfur (S) in a solid sample such as steel, nonferrous metal, ceramics or coke or the like, as shown in a patent document 1, there is a non-dispersive infrared absorption (NDIR) analyzer that analyzes carbon dioxide ($CO_2$), carbon monoxide (CO), and sulfur dioxide ($SO_2$) contained in the combustion gas generated from the solid sample by burning the solid sample contained in a crucible in a combustion furnace.

In this NDIR analyzer for analyzing the solid sample, an infrared lamp is used. Since the infrared lamp emits a broad infrared light that includes the absorption wavelength range of a component to be measured, it is necessary to provide a wavelength selective filter in front of the photodetector in order to measure the concentration of the component to be measured. This wavelength selective filter reduces an amount of the light detected by the photodetector, resulting in a poor signal-to-noise (SN) ratio. As a result of this, the analysis accuracy of the component to be measured becomes poor, especially in a low concentration range.

On the other hand, as shown in a patent document 2, there is an analyzer that measures the concentration of $SO_2$ contained in a combustion gas by using the ultraviolet fluorescence method. If the ultraviolet fluorescence method, which is more sensitive than infrared absorption, is used, it is possible to analyze $SO_2$ accurately even in the low concentration range.

However, since the ultraviolet light source used in the ultraviolet fluorescence method tends to decrease in the light intensity with age, it is necessary to replace the ultraviolet light source frequently so that there is a problem that frequent maintenance is required.

PRIOR ART DOCUMENTS

Patent Document

Patent document 1: Japanese Unexamined Patent Application Publication No. 6-265475
Patent document 2: Japanese Unexamined Patent Application Publication No. 2011-169753

DISCLOSURE OF THE INVENTION

Problem to be Solved by the Invention

The present invention is to solve the above-mentioned problems, and a main object of this invention is to reduce frequency of maintenance in a sample analyzing apparatus, while securing analysis of the component to be measured.

Means to Solve the Problems

More specifically, a sample analyzing apparatus in accordance with this invention comprises a heating furnace that heats a sample held by a sample holding body that holds the sample, and a gas analysis section that analyzes a component to be measured contained in a gas produced by heating the sample, and is characterized by that the gas analysis section comprises a laser light source that irradiates the gas with a laser light, and a photodetector that detects an intensity of a sample light as being the laser light that has transmitted through the gas.

In accordance with the sample analyzing apparatus, since the gas analysis section comprises the laser light source that irradiates the gas with the laser light and a photodetector that detects the intensity of the sample light as being the laser light that has transmitted through the gas, if the laser light with an oscillation wavelength tailored to the component to be measured is irradiated, there is no need of providing a wavelength selective filter in front of the photodetector so that it is possible to prevent the light intensity due to the wavelength selective filter from being degraded, thereby increasing the signal-to-noise ratio. As a result of this, it is possible to analyze the component to be measured reliably. In addition, since the laser light source is used, it is possible to reduce the maintenance frequency. In accordance with the present claimed invention, it is possible to reliably analyze the component to be measured while reducing the frequency of maintenance in the sample analyzing apparatus.

It is preferable that the laser light source emits a modulated light whose wavelength is modulated at a predetermined modulation frequency.

In accordance with this arrangement, it is possible to analyze the component to be measured by the wavelength modulation spectroscopy method (WMS) using the intensity related signal obtained by emitting the modulated light whose wavelength is modulated at a predetermined modulation frequency. As a result of this, it is possible to reduce the influence of interference components on the concentration of the component to be measured It is preferable that the gas analysis section further comprises a first calculation section that calculates a representative value that depends on a concentration of the component to be measured by using an intensity related signal relating to the intensity of the sample light and a characteristic signal that has a predetermined correlation to the intensity related signal, and a second calculation section that calculates the concentration of the component to be measured by using the representative value obtained by the first calculation section.

In accordance with this arrangement, since the wavelength modulation method calculates the concentration of the component to be measured by calculating the representative value that depends on the concentration of the component to be measured from the intensity related signal relating to the intensity of the sample light and using the representative value, it is possible to reliably analyze the component to be measured contained in the solid sample while spectral calculation processing for concentration quantification, which is necessary in conventional WMS, is made unnecessary. In addition, since the ultraviolet fluorescence method is not used, there is no need of using an ultraviolet light source, and maintenance such as frequent replacement of the ultraviolet light source can be eliminated.

Concretely, it is preferable that the first calculation section calculates a sample correlation value, which is a correlation value between the intensity related signal and the characteristic signal, as the representative value, and the second calculation section calculates the concentration of the component to be measured by using the sample correlation value. In the present claimed invention, calculating the correlation value includes taking the inner product of the intensity related signal and the characteristic signal as well as taking the correlation between the intensity related signal and the characteristic signal.

In accordance with this arrangement, since the sample correlation value between the intensity related signal relating to the intensity of the sample light and the characteristic signal is calculated, and the concentration of the component to be measured is calculated using the calculated sample correlation value, the characteristics of an absorption signal can be captured with dramatically fewer variables without converting the absorption signal into an absorption spectrum so that it is possible to measure the concentration of the component to be measured with a simple calculation without complicated spectral calculation processing. For example, a number of data points used in general spectrum fitting requires several hundred, however, in the present claimed invention, it is possible to calculate the concentration with the same accuracy by using at most a few to several dozen correlation values. As a result of this, the load of the arithmetic processing can be dramatically reduced and an advanced arithmetic processing unit becomes unnecessary so that it is possible to reduce the cost of the analyzing apparatus and to downsize it.

The sample analyzing apparatus is to analyse a plurality of the components to be measured contained in the gas and it is preferable that a plurality of the laser light sources are provided, and the plurality of the laser light sources emit the laser light with an oscillation wavelength corresponding to the respectively different components to be measured.

It is preferable that the plurality of the components to be measured are at least one of $CO_2$, CO, $SO_2$, $H_2O$, and NOx.

In case of using the NDIR analyzer, water ($H_2O$) contained in the gas becomes an interference component so that measurement errors cause in the $CO_2$, CO, and $SO_2$ concentrations. Then, a dehydrator is provided in an upstream side of the NDIR analyzer to remove the water contained in the gas.

Since there is no need of using an NDIR analyzer for the sample analyzing apparatus of the present claimed invention, it is not necessary to arrange a dehydrating agent in the upstream side of the gas analysis section. Then, it is preferable that the sample analyzing apparatus of the present invention further comprises a gas flow channel that connects the heating furnace and the gas analysis section and that introduces the gas from the heating furnace into the gas analysis section without dehydrating the gas using a dehydrating agent.

In accordance with this arrangement, it is possible to make a dehydrating agent unnecessary so that the maintenance of periodically replacing the dehydrating agent can be made unnecessary. In addition, since there is no need of a dehydrating agent, it is possible to simplify the arrangement of the sample analyzing apparatus.

Furthermore, it is preferable that the sample analyzing apparatus of the present claimed invention further comprises an analyzer (NDIR analyzer) using a non-dispersive infrared absorption method in addition to the gas analysis section. As mentioned above, it is possible to expand the measurement range by using the above-mentioned gas analysis section and the NDIR analyzer together.

Effect of the Invention

In accordance with the above-mentioned present claimed invention, it is possible to reliably analyze the component to be measured while reducing the frequency of maintenance in a sample analyzing apparatus.

EXPLANATION OF CODES

Figure 1:
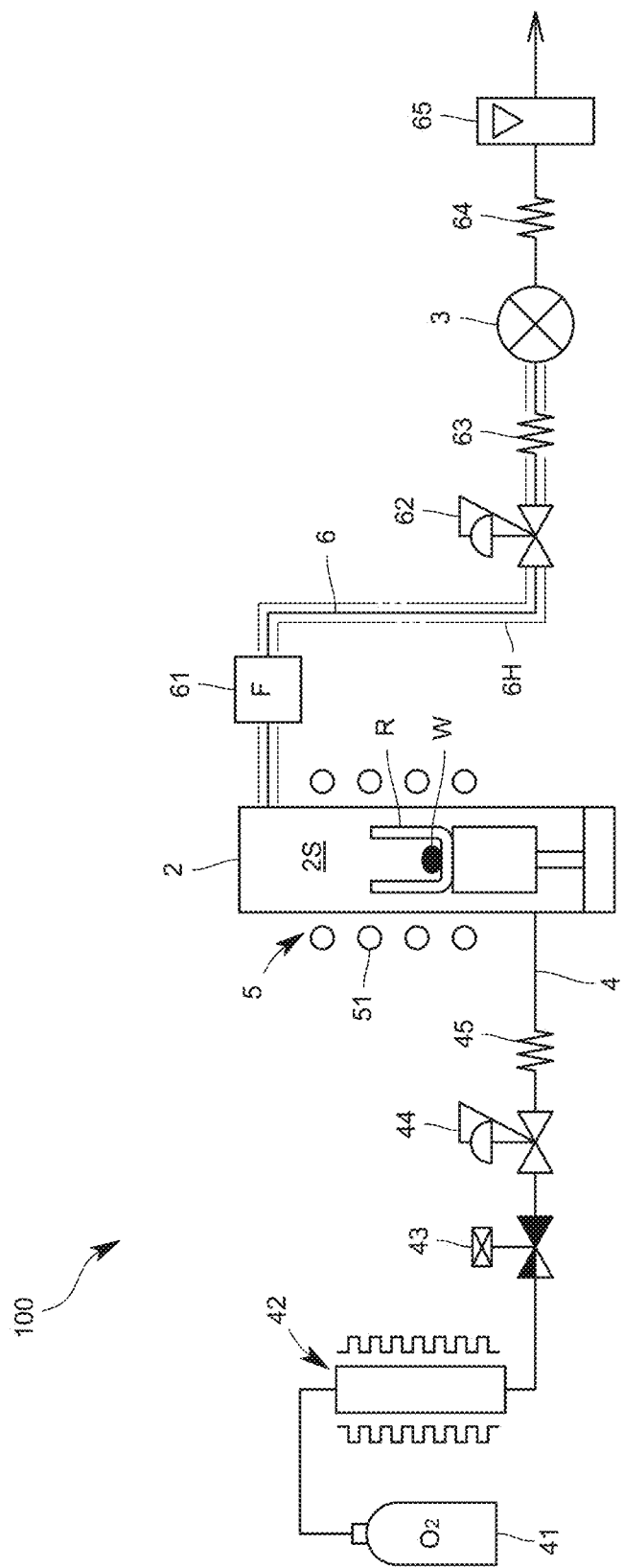
FIG. 1 An overall schematic diagram of a sample analyzing apparatus in accordance with one embodiment of the present claimed invention.

100 . . . sample analyzing apparatus
W . . . sample
R . . . container (sample holding body)
2 . . . heating furnace
3 . . . gas analysis section
6 . . . gas flow channel
11 . . . cell
12 . . . laser light source (semiconductor laser)
13 . . . photodetector
162 . . . correlation value calculation section (first calculation section)
164 . . . concentration calculation section (second calculation section)
167 . . . synchronization detection signal generation section (first calculation section)
168 . . . concentration calculation section (second calculation section)

BEST MODES OF EMBODYING THE INVENTION

First Embodiment

The sample analyzing apparatus 100 in accordance with a first embodiment of the present claimed invention will be described with reference to drawings.

The sample analyzing apparatus 100 of this embodiment analyzes carbon or sulfur in a sample of steel, nonferrous metals, ceramics or coke, organic matter, minerals, heavy oil, and the like. In the following, as an example of the sample analyzing apparatus, a metal analyzing apparatus that analyzes carbon or sulfur in a solid sample (W) will be described.

Concretely, the sample analyzing apparatus 100 combusts the solid sample (W) in an oxygen stream and analyzes a component to be measured contained in the gas generated by the combustion by using the infrared absorption method. As shown in FIG. 1, the sample analyzing apparatus 100 comprises a heating furnace 2 that heats a container (R) that holds and burns the solid sample (W), and a gas analysis section 3 that analyzes the component to be measured contained in the gas generated by the combustion of the solid sample (W). The container (R) of this embodiment, which is a sample holding body, is called a crucible made of magnetic materials such as ceramics.

The heating furnace 2 has a heating space 2S in which the container (R) containing the solid sample (W) is arranged, and an oxygen gas (02) is supplied as a carrier gas to the heating space 2S. For this purpose, a carrier gas supply channel 4 is connected to the heating furnace 2. In addition, a carrier gas purifier 42 for refining the carrier gas (the oxygen gas) from a gas cylinder 41 is arranged in the carrier gas supply channel 4. If the carrier gas from the gas cylinder 41 is a clean gas, the carrier gas purifier 42 may be omitted. Furthermore, the carrier gas supply channel 4 may be provided with an open/close valve 43, a pressure regulating valve 44, and a flow regulator 45 such as a capillary, if necessary.

In addition, the heating furnace 2 is of a high-frequency induction heating furnace type, and a heating mechanism 5 is arranged for high-frequency induction heating the solid sample (W) in the container (R) arranged in the heating space 2S. The heating mechanism 5 has a coil 51 and a power supply, not shown in the figures, which applies a high-frequency AC voltage to the coil 51. The coil 51 is wound along a side peripheral wall of the heating furnace 2. In addition, the coil 51 is arranged at a height to surround the container (R) arranged in the heating space 2S.

When the high-frequency AC voltage is applied to the coil 51, an induction current flows near a surface of the solid sample (W) housed in the container (R) made of a magnetic material, and the solid sample (W) generates the Joule heat. As a result of the heat generation, a combustion reaction is caused by oxygen, and the solid sample (W) burns to generate a gas (hereinafter referred to as a sample gas). A combustion improver may be housed in the container (R) together with the solid sample (W), and the solid sample (W) may be heated by the inductive current flowing through the combustion improver.

The sample gas produced by the heating furnace 2 is introduced into the gas analysis section 3 through the gas flow channel 6. One end of the gas flow channel 6 is connected to the heating furnace 2, and a dust filter 61 and the gas analysis section 3 are arranged on the gas flow channel 6 from the upstream side thereof. The other end of the gas flow channel 6 is open to the atmosphere. In this embodiment, a pressure regulating valve 62 and a flow regulator 63 such as a capillary are arranged between the dust filter 61 and the gas analysis section 3, however, these are not essential components. In addition, a flow regulator 64 such as a capillary and a flow meter 65 are arranged in a downstream side of the gas analysis section 3, however, these are also not essential components. Furthermore, since the gas flow channel 6 of this embodiment is not provided with a dehumidifier, the gas flow channel 6 is heated to at least 100° C. or higher by a heating mechanism 6H, at least to the gas analysis section 3, in order to prevent condensation of moisture contained in the sample gas. At least the dust filter 61 is also heated to 100° C. or higher by this heating mechanism 6H.

Figure 2:
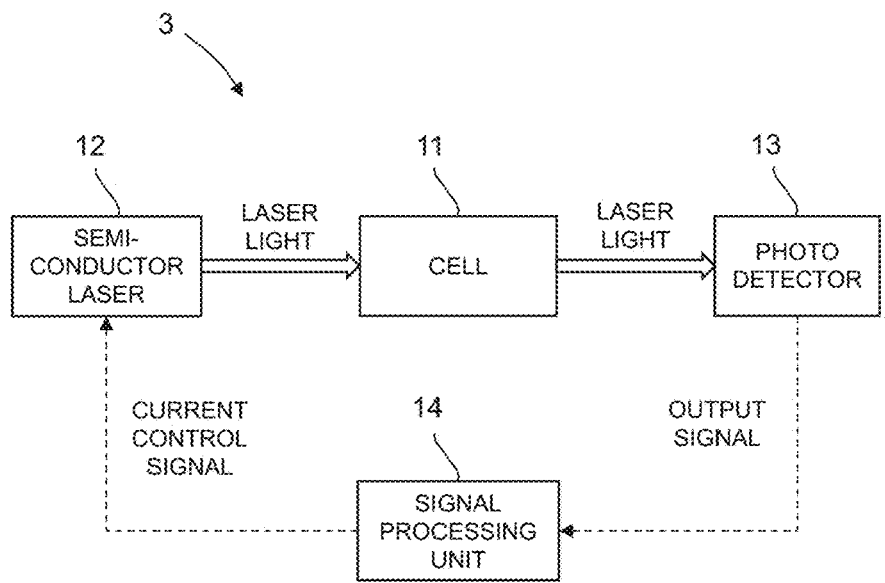
FIG. 2 An overall schematic diagram of a gas analysis section in accordance with the embodiment.

As shown in FIG. 2, the gas analysis section 3 is a concentration measurement unit for measuring the concentration of the component to be measured (in this embodiment, for example, CO, $CO_2$, or $SO_2$) contained in the sample gas, and comprises a cell 11 into which the sample gas is introduced, a semiconductor laser 12 as a laser light source that irradiates the cell 11 with a modulated laser light, a photodetector 13 that is arranged on an optical path of the sample light, which is the laser light that has transmitted through the cell 11, and that receives the sample light, and a signal processing unit 14 that receives an output signal of the photodetector 13 and that calculates the concentration of the component to be measured based on the value of the output signal.

Each section will be described below.

The cell 11 is made of a transparent material, such as quartz, calcium fluoride, barium fluoride, etc., which absorbs very little light in an absorption wavelength band of the component to be measured, and in which a light incident opening and a light exit opening are formed. The cell 11 has an inlet port, not shown in drawings, for introducing the sample gas into inside of the cell 11 and an outlet port, not shown in drawings, for discharging the sample gas inside of the cell 11 and the sample gas is introduced and sealed into the cell 11 through the inlet port.

The semiconductor laser 12 is a quantum cascade laser (QCL), which is a kind of the semiconductor laser 12 in this embodiment, and oscillates a mid-infrared (4-12 μm) laser light. This semiconductor laser 12 is capable of modulating (changing) its oscillation wavelength by a given electric current (or voltage). As long as the oscillation wavelength is variable, other types of lasers may be used, and the temperature may be varied to change the oscillation wavelength.

The photodetector 13 is a thermal type such as thermopile, which is relatively inexpensive, however, other types of photodetectors may be used, such as quantum photodetectors, for example, HgCdTe, InGaAs, InAsSb, or PbSe, which has good responsivity.

Figure 3:
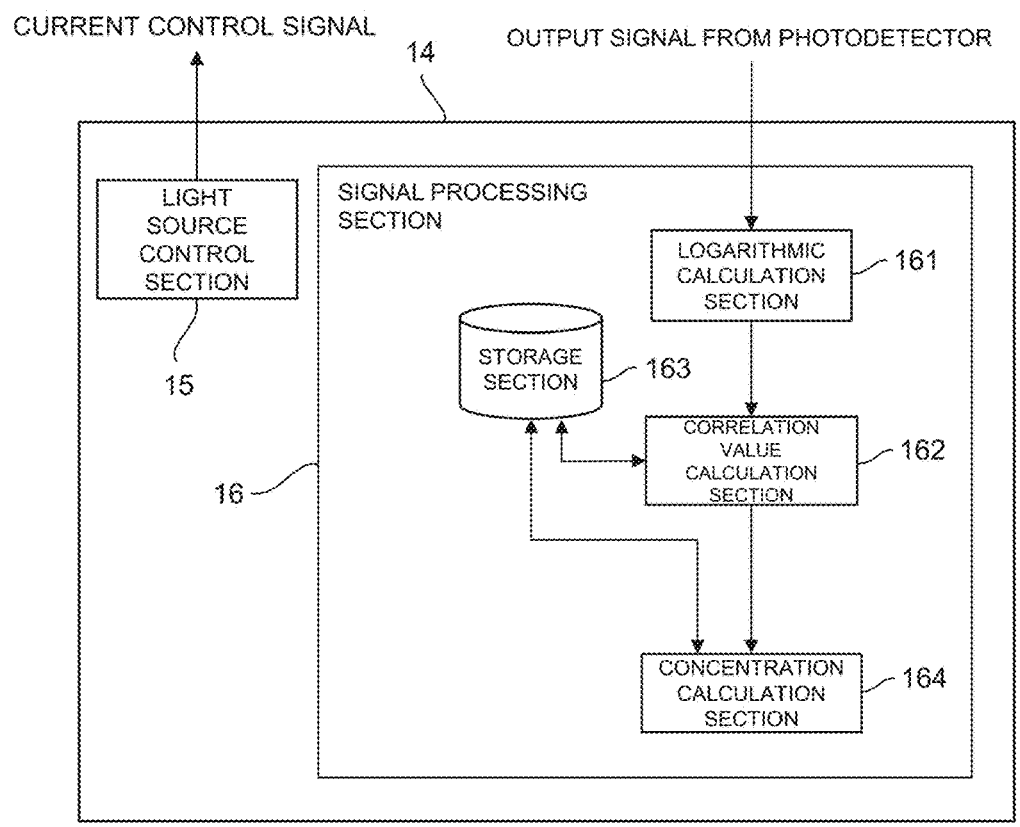
FIG. 3 A functional block diagram of a signal processing unit in accordance with the embodiment.

The signal processing unit 14 comprises an analog electric circuit consisting of a buffer, an amplifier or the like, a digital electric circuit consisting of a CPU, a memory or the like, and an AD converter, a DA converter or the like, which mediate between the analog electric circuit and the digital electric circuit. As shown in FIG. 3, the signal processing unit 14 produces functions as a light source control section 15 that controls the output of the semiconductor laser 12, and a signal processing section 16 that receives the output signal from the photodetector 13 and that calculates the concentration of the component to be measured by processing the value of the output signal by cooperating the CPU and its peripheral devices based on predetermined programs stored in a predetermined area of the memory.

Each section will be described in detail below.

The light source control section 15 controls a current source (or a voltage source) of the semiconductor laser 12 by outputting a current (or voltage) control signal. Concretely, the light source control section 15 changes a driving current (or a driving voltage) of the semiconductor laser 12 at a predetermined frequency and modulates an oscillation wavelength of the laser light output by the semiconductor laser 12 at a predetermined frequency relative to a center wavelength. This causes the semiconductor laser 12 to emit a modulated light modulated at a predetermined modulation frequency.

Figure 4:
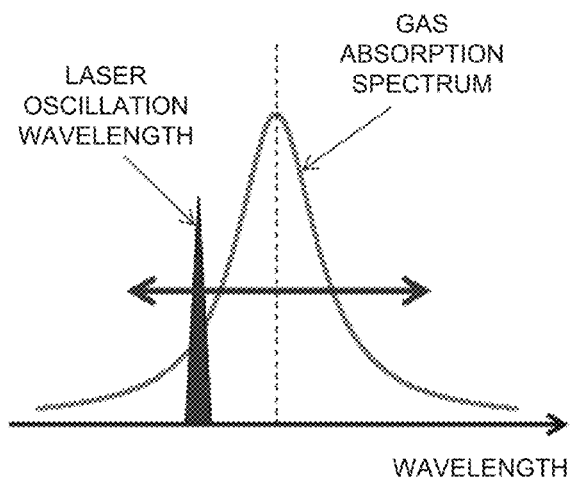
FIG. 4 A schematic diagram showing a modulation method of a laser oscillation wavelength in accordance with the embodiment.
Figure 5:
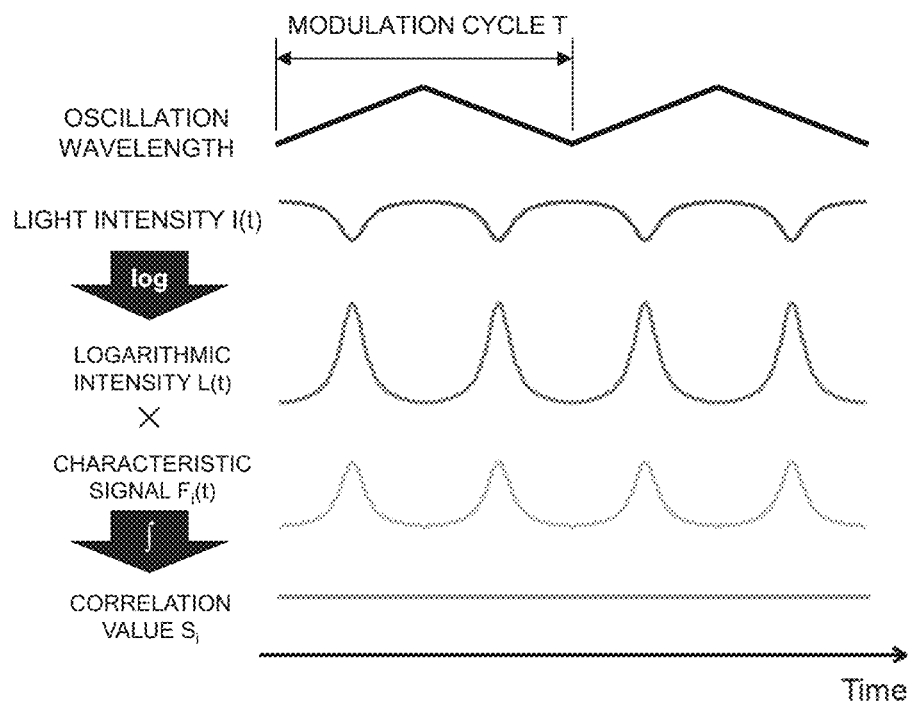
FIG. 5 A time series graph showing an example of an oscillation wavelength, a light intensity I(t), a logarithmic intensity L(t), a characteristic signal $F_i(t)$, and a correlation value $S_i$ in accordance with the embodiment.

In this embodiment, the light source control section 15 changes the driving current in a triangular wave form and modulates the oscillation frequency in the triangular wave form (refer to "oscillation wavelength" in FIG. 5). In practice, a different function is used to modulate the driving current so that the oscillation frequency becomes the triangular wave form. In addition, the oscillation wavelength of the laser light is modulated so that a peak of an optical absorption spectrum of the component to be measured is the center wavelength, as shown in FIG. 4. The light source control section 15 may change the driving current in a sinusoidal state, a saw-wave state or an arbitrary function state and may modulate the oscillation frequency in a sinusoidal state, a saw-wave state or an arbitrary function state.

The signal processing section 16 comprises a logarithmic calculation section 161, a correlation value calculation section (first calculation section) 162, a storage section 163 and a concentration calculation section (second calculation section) 164 or the like.

The logarithmic calculation section 161 conducts a logarithmic calculation on a light intensity signal, which is an output signal of the photodetector 13. The function I(t) indicating a chronological change of the light intensity signal obtained by the photodetector 13 is as shown in "light intensity I(t)" in FIG. 5, and if conducting the logarithmic calculation, it becomes as shown in "logarithmic intensity L(t)" in FIG. 5.

The correlation value calculation section 162 calculates each of the correlation values between the intensity related signal relating to the intensity of the sample light and a plurality of predetermined characteristic signals. The characteristic signals are signals for extracting the waveform characteristics of the intensity related signals by correlating with the intensity related signals. A sinusoidal signal or various other signals that match the waveform characteristics to be extracted from the intensity related signal can be used as the characteristic signal.

In the following, an example of a case where something other than the sinusoidal signal is used as the characteristic signal will be described. The correlation value calculation section 162 calculates each of the correlation values between the intensity related signal relating to the intensity of the sample light and a plurality of characteristic signals for which a correlation different from the sinusoidal signal (sinusoidal function) is obtained to the intensity related signal. In this embodiment, the correlation value calculation section 162 uses the logarithmically calculated light intensity signal (logarithmic intensity L(t)) as the intensity related signal.

In addition, the correlation value calculation section 162 calculates the plurality of sample correlation values ($S_i$), which are the respective correlation values between the intensity related signal of the sample light and the plurality of characteristic signals, using a number, which is greater than or equal to a number obtained by adding a number of types of components to be measured to a number of types of interference components, of the characteristic signals $F_i(t)$ (i=1, 2, . . . , n) according to the following formula (expression 1). T in the expression 1 is a cycle of the modulation.

$$S_i = \int_0^T L(t) \cdot F_i(t) dt \quad (i = 1, 2, ..., n) \quad \text{[Expression 1]}$$

$$R_i = \int_0^T L_0(t) \cdot F_i(t) dt \quad (i = 1, 2, ..., n)$$

$$S_i' = S_i - R_i$$

When calculating the sample correlation values, as shown in the expression 1, it is preferable that the correlation value calculation section 162 calculates the sample correlation value ($S_i'$) that is obtained by conducting the calibration by subtracting the reference correlation value ($R_i$), which is the correlation value between the intensity related signal Lo(t) of the reference light and the plurality of the characteristic signals $F_i(t)$, from the correlation value ($S_i$) between the intensity related signal L(t) of the sample light and the plurality of the characteristic signals $F_i(t)$. In accordance with this calculation, the offset included in the sample correlation value is removed, and the correlation value becomes proportional to the concentration of the component to be measured and the concentration of the interference component so that it is possible to reduce the measurement error. It is also possible to use an arrangement in which the reference correlation value is not subtracted.

In this embodiment, the acquisition timing of the reference light is simultaneous with that of the sample light, before or after the measurement, or at any timing. The intensity related signal of the reference light or the reference correlation value may be acquired in advance and stored in the storage section 163. In addition, a method for acquiring the reference light simultaneously with the sample light can be conceived that two photodetectors 13 are arranged and the modulated light from the semiconductor laser 12 is split by a beam splitter or the like so that one is used for the sample light measurement and the other is used for the reference light measurement.

In this embodiment, the correlation value calculation section 162 uses a function that is easier to capture waveform features of the logarithmic intensity $L(t)$ than a sine function as the plurality of the characteristic signals $F_i(t)$. In case of the sample gas containing the component to be measured (for example, $SO_2$) and one interference component (for example, $H_2O$), it can be conceived that two or more characteristic signals $F_1(t)$ and $F_2(t)$ are used, and it can be conceived that a function based on the Lorentz function that is close to a shape of an absorption spectrum and a derivative function of the function based on the Lorenz function are used. In addition, instead of the Lorentz function, it is also possible that a function based on the Voigt function or a function based on the Gaussian function is used as the characteristic signal. By using such functions as the characteristic signal, a larger correlation value can be obtained than that is obtained when a sine function is used so that it is possible to improve a measurement accuracy.

In this embodiment, it is preferable to adjust the offset of the characteristic signal to remove the DC component, more specifically, to make the DC component zero when integrated in the modulation period. In accordance with this arrangement, it is possible to remove an influence of the offset on the intensity related signal due to fluctuations in the light intensity. Instead of removing the DC component of the characteristic signal, the DC component of the intensity related signal may be removed, or the DC component of both the characteristic signal and the intensity related signal may be removed. In addition, an actual measured value of the absorption signal of the component to be measured and/or the interference component, or its imitation, respectively, may be used as the characteristic signal.

If the two characteristic signals $F_1(t)$ and $F_2(t)$ are made to be orthogonal functions or functions close to the orthogonal functions that are orthogonal to each other, it is possible to extract the characteristic of the logarithmic intensity $L(t)$ more efficiently and to make the concentration obtained by the simultaneous equations, to be described later, more accurate.

The storage section 163 stores an alone correlation value, which is a correlation value per unit concentration of the component to be measured and each of the interference components, obtained from the respective intensity related signals and the plurality of characteristic signals $Fi(t)$ when the component to be measured and each of the interference components exist alone. The plurality of the characteristic signals $F_i(t)$ used to obtain this alone correlation value are the same as the plurality of the characteristic signals $F_i(t)$ used in the correlation value calculation section 162.

In this embodiment, in case of storing the alone correlation value, it is preferable that the storage section 163 stores the alone correlation value, which is a value obtained by subtracting the reference correlation value from the correlation value in case that the component to be measured and each of the interference components exist alone and the value is calibrated by converting into per unit concentration. This eliminates the offset contained in the alone correlation value so that the alone correlation value is made to be proportional to the concentration of the component to be measured and the interference components so that it is possible to reduce measurement errors. The arrangement may be so not to subtract the reference correlation value.

The concentration calculation section 164 calculates the concentration of the component to be measured by using the plurality of the sample correlation values obtained by the correlation value calculation section 162.

Concretely, the concentration calculation section 164 calculates the concentration of the component to be measured based on the plurality of the sample correlation values obtained by the correlation value calculation section 162 and the plurality of the alone correlation values stored in the storage section 163. More specifically, the concentration calculation section 164 calculates the concentration of the component to be measured by solving simultaneous equations consisting of the plurality of the sample correlation values obtained by the correlation value calculation section 162, the plurality of the alone correlation values stored in the storage section 163, and the concentrations of the component to be measured and each of the interference components, respectively.

Next, an example of the operation of this sample analyzing apparatus 100 will be described, along with a detailed explanation of each of the above-mentioned sections. In the following, it is assumed that the sample gas contains one component to be measured (for example, $SO_2$) and one interference component (for example, $H_2O$).

<Reference Measurement>

First, the light source control section 15 controls the semiconductor laser 12 to modulate the wavelength of the laser light both at the modulation frequency and around the peak of the absorption spectrum of the component to be measured. Prior to the reference measurement using a span gas, the reference measurement using the zero gas may be conducted to measure the reference correlation value.

Next, the reference measurement is conducted by introducing the span gas (gas whose component concentration is known) into the cell 11 by an operator or automatically. This reference measurement is conducted for the span gas in which the component to be measured exists alone and for the span gas in which the interference component exists alone.

Concretely, in the reference measurement, the logarithmic calculation section 161 receives the output signal of the photodetector 13 and calculates the logarithmic intensity $L(t)$. Then, the correlation value calculation section 162 calculates the alone correlation value, which is the correlation value of each span gas per unit concentration, by calculating the correlation value between the logarithmic intensity $L(t)$ and the two characteristic signals $F_1(t)$ and $F_2(t)$ and dividing a value that is obtained by subtracting the reference correlation value from the correlation value by the concentration of the span gas. Instead of calculating the alone correlation value, the relationship between the span gas concentration and the correlation value of the span gas may be stored.

Concretely, it is as follows.

Figure 6:
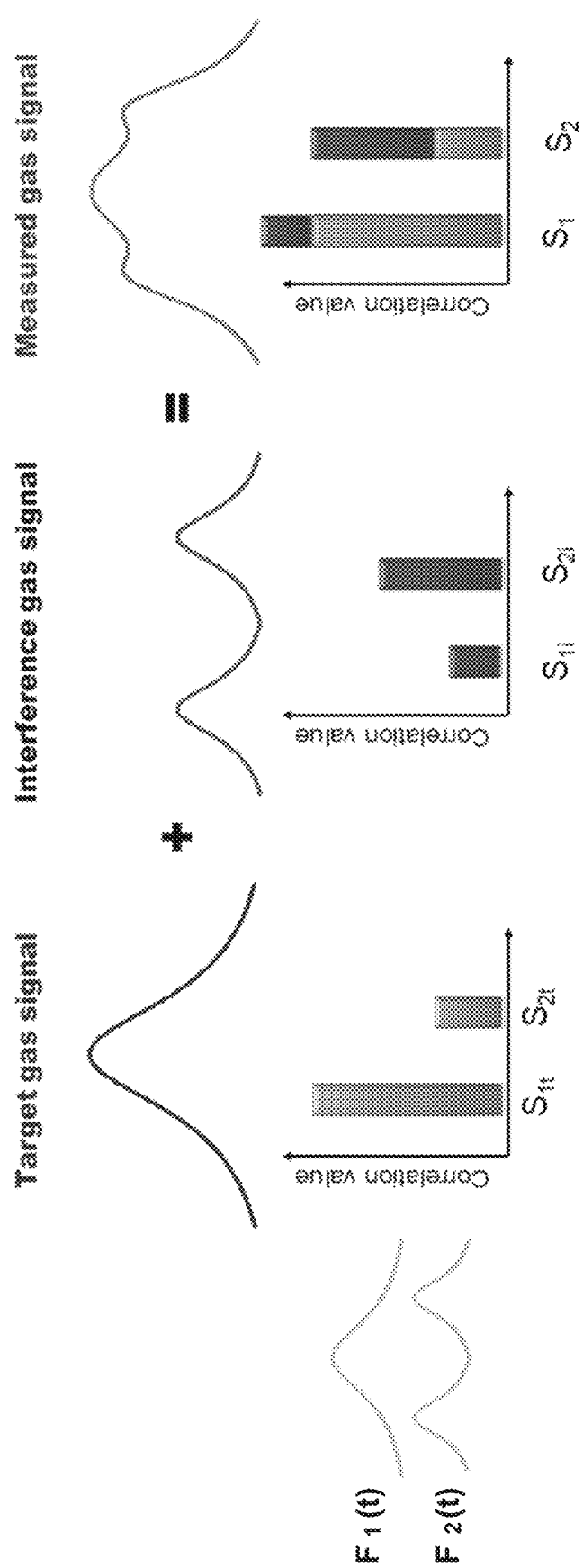
FIG. 6 A diagram showing a conceptual diagram of concentration calculation using an alone correlation value and a sample correlation value in accordance with the embodiment.

The correlation values $S_{1t}$ and $S_{2t}$ of the component to be measured are calculated by the correlation value calculation section 162 by introducing the span gas in which the component to be measured exists alone into the cell 1 (refer to FIG. 6). In this embodiment, $S_{1t}$ is the correlation value to a first characteristic signal, and $S_{2t}$ is the correlation value to a second characteristic signal. Then, the correlation value calculation section 162 calculates the alone correlation values $s_{1t}$ and $s_{2t}$ by dividing a value that is obtained by subtracting the reference correlation value $R_i$ from those correlation values $S_{1t}$ and $S_{2t}$ by the span gas concentration $c_t$ of the component to be measured. The span gas concentration $c_t$ of the component to be measured is input to the signal processing section 16 in advance by a user or the like.

In addition, the correlation values $S_{1i}$ and $S_{2i}$ of the interference components are calculated by the correlation value calculation section 162 by introducing the span gas in which the interference component exists alone into the cell 1 (refer to FIG. 6). In this embodiment, $S_{1i}$ is the correlation value to the first characteristic signal, and $S_{2i}$ is the correlation value to the second characteristic signal. Then, the correlation value calculation section 162 calculates the alone correlation values $s_{1i}$ and $s_{2i}$ by dividing a value that is obtained by subtracting the reference correlation value from those correlation values $S_{1i}$ and $S_{2i}$ by the span gas concentration $c_i$ of the interference component. The span gas concentration of the interference component $c_i$ is input to the signal processing unit 16 in advance by a user or the like.

The alone correlation values $s_{1t}$, $s_{2t}$, $s_{1i}$, $s_{2i}$ calculated as described above are stored in the storage section 163. The reference measurement may be performed before the product is shipped or may be performed periodically.

<Sample Measurement>

The light source control section 15 controls the semiconductor laser 12 and modulates the wavelength of the laser light both at the modulation frequency and around the peak of the absorption spectrum of the component to be measured.

Next, the sample measurement is performed by introducing the sample gas generated in the heating furnace 2 into the cell 11 through the gas flow channel 6 by the operator or automatically.

Concretely, in the sample measurement, the logarithmic calculation section 161 receives the output signal of the photodetector 13 and calculates the logarithmic intensity $L(t)$. Then, the correlation value calculation section 162 calculates the sample correlation values $S_1$ and $S_2$ between the logarithmic intensity $L(t)$ and the plurality of the characteristic signals $F_1(t)$ and $F_2(t)$ and calculates the sample correlation values $S_1'$ and $S_2'$ by subtracting the reference correlation value $R_i$ from the sample correlation values $S_1$ and $S_2$ (refer to FIG. 6).

Then, the concentration calculation section 164 solves following simultaneous equations with two unknown numbers comprising the sample correlation values $S_1'$, $S_2'$ calculated by the correlation value calculation section 162, the alone correlation values $s_{1t}$, $s_{2t}$, $s_{1i}$, $s_{2i}$ of the storage section 163, and each of the concentrations $C_{tar}$, $C_{int}$ of the component to be measured and each of the interference components respectively.

$$s_{1t}C_{tar} + s_{1i}C_{int} = S_1' \qquad \text{[Expression 2]}$$
$$s_{2t}C_{tar} + s_{2i}C_{int} = S_2'$$

As a result of this, it is possible to determine the concentration $C_{tar}$ of the component to be measured, from which the interference influence has been removed, by a simple and reliable operation of solving the above simultaneous equations (expression 2).

Even in a case wherein two or more interference components can be assumed to exist, it is possible to determine the concentration of the component to be measured from which the interference influence has been removed similarly by adding the alone correlation value by a number of the interference components and by solving the simultaneous equations with the same unknown number as the number of the types of the component.

More specifically, in case that generally there are n types of gases including the component to be measured and the interference components, if the alone correlation value of the kth gas type in the mth characteristic signal is $s_{mk}$, the concentration of the kth gas type is $C_k$, and the sample correlation value in the mth characteristic signal $F_m(t)$ is $S_m'$, the following equation (expression 3) is established.

$$\begin{aligned} s_{11}C_1 + s_{12}C_2 + s_{13}C_3 + \ldots + s_{1n}C_n &= S_1' \\ s_{21}C_1 + s_{22}C_2 + s_{23}C_3 + \ldots + s_{2n}C_n &= S_2' \\ s_{31}C_1 + s_{32}C_2 + s_{33}C_3 + \ldots + s_{3n}C_n &= S_3' \\ &\vdots \\ s_{n1}C_1 + s_{n2}C_2 + s_{n3}C_3 + \ldots + s_{nn}C_n &= S_n' \end{aligned} \qquad \text{[Expression 3]}$$

It is possible to determine the concentration of each of the gases of the component to be measured and the interference component by solving the simultaneous equations with n unknown numbers represented by this equation (expression 3).

Next, a difference in an analysis accuracy of $SO_2$ concentration between the sample analyzing apparatus 100 using the gas analysis section 3 of this embodiment (hereinafter also referred to as "this embodiment") and a metal analysis unit using a conventional NDIR analyzer (hereinafter also referred to as the "NDIR") will be explained. In the metal analysis unit using the conventional NDIR analyzer, a dehumidifier is arranged in an upstream side of the NDIR analyzer.

Figure 7:
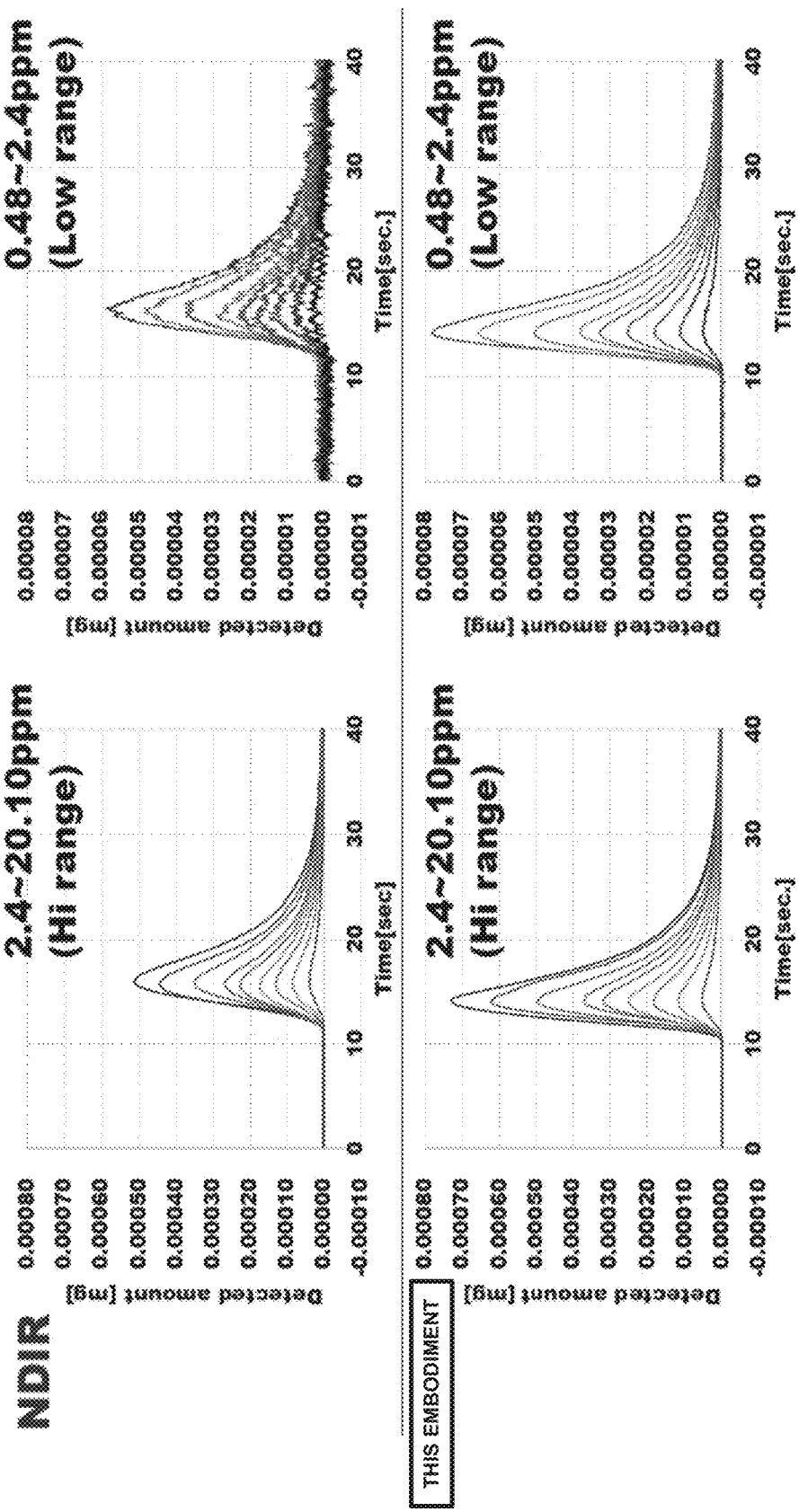
FIG. 7 A diagram showing peak waveforms in a high concentration range and a low concentration range detected by a conventional metal analyzer and a metal analyzer of the present claimed invention.

FIG. 7 indicates peak waveforms detected by the NDIR and this embodiment in the high concentration range (2.4 to 20.10 ppm) and the low concentration range (0.48 to 2.4 ppm). As can be seen from FIG. 7, the peak waveform in the low concentration range detected by this embodiment is smoother than that detected by the NDIR.

Figure 8:
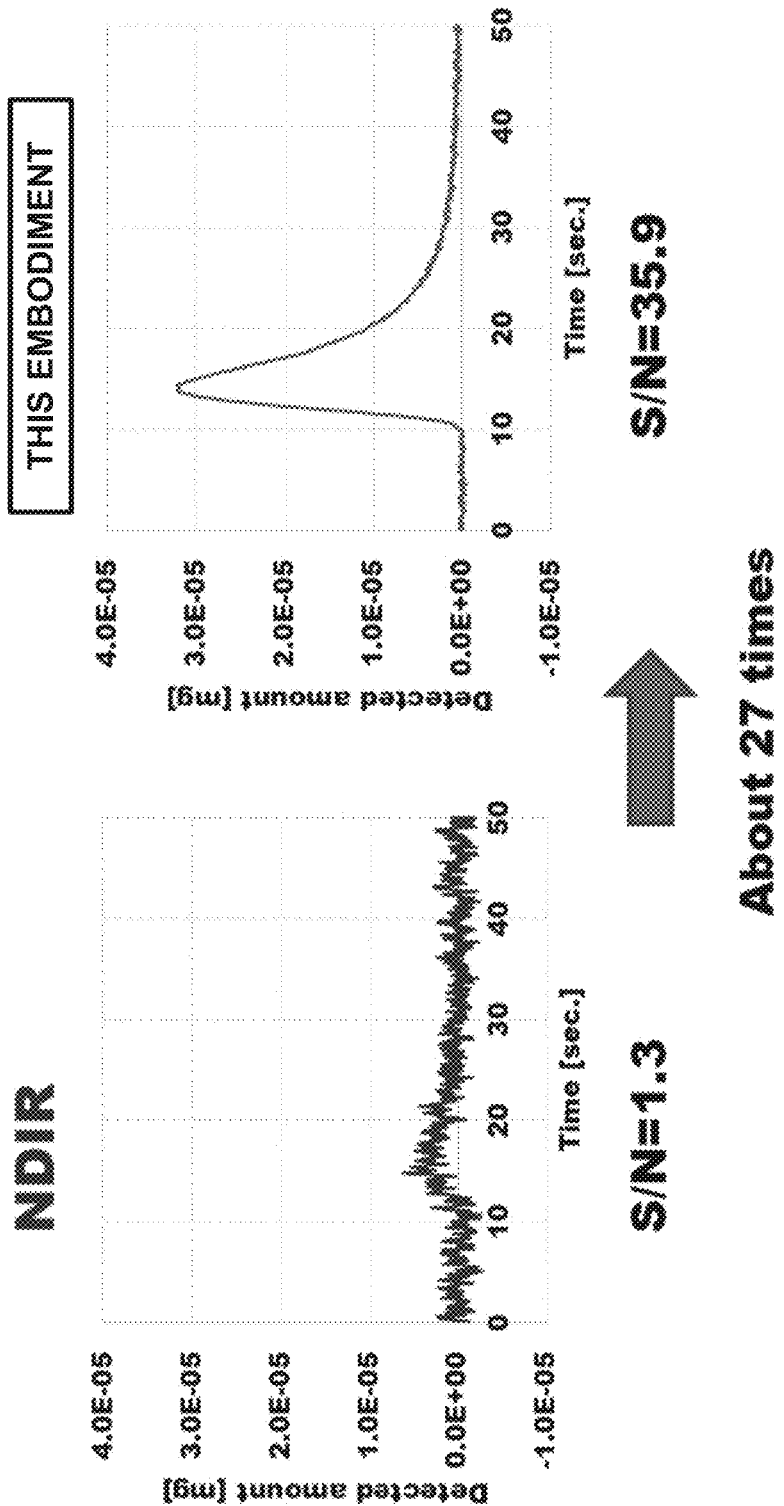
FIG. 8 A diagram showing the peak waveforms detected by the conventional metal analyzer and the metal analyzer of the present claimed invention when the $SO_2$ concentration is 0.48 ppm.

In addition, FIG. 8 shows the peak waveforms detected by the NDIR and this embodiment when the $SO_2$ concentration is 0.48 ppm. As can be seen from FIG. 8, the signal-to-noise by the NDIR is 1.3, while the signal-to-noise by this embodiment is 35.9. As mentioned above, if this embodiment is used, the signal-to-noise ratio is about 27 times higher than that of the NDIR.

Figure 9:
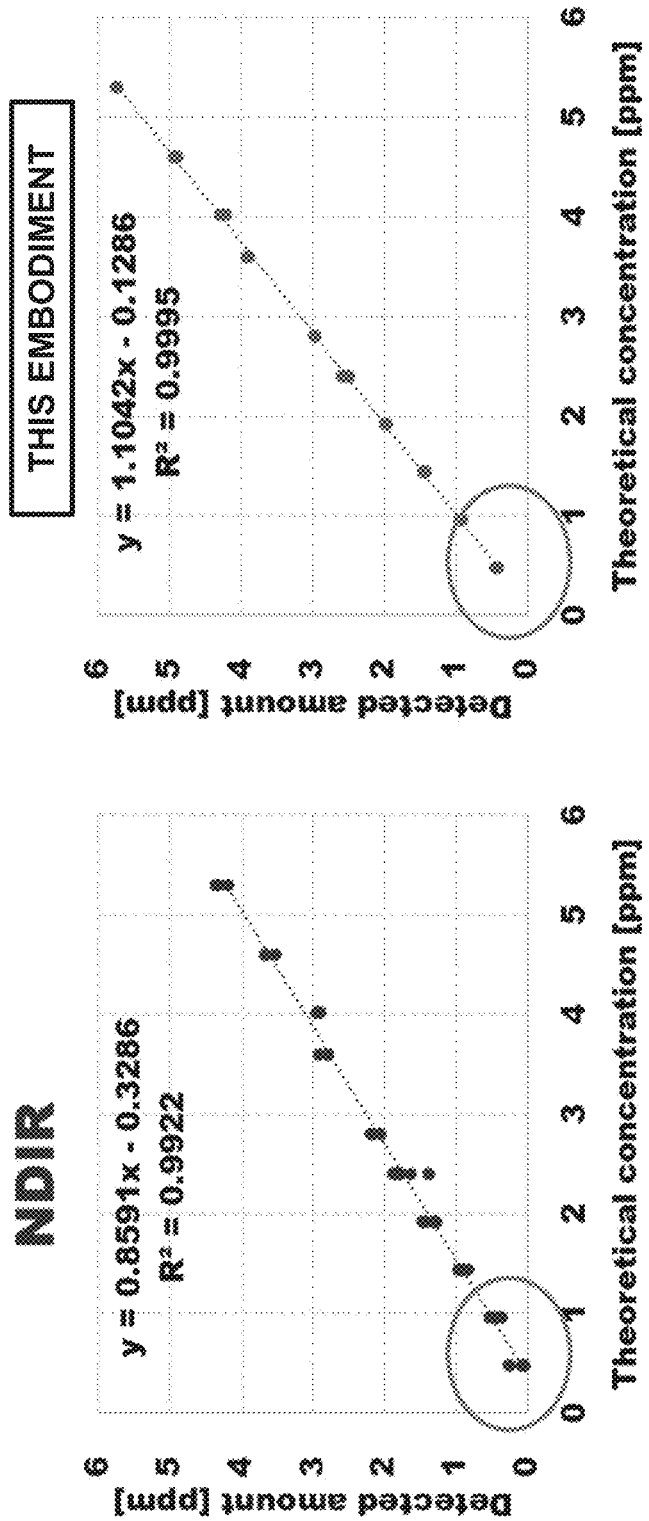
FIG. 9 A diagram showing results of examining linearity of the conventional metal analyzer and the sample analyzing apparatus of the present claimed invention.

Next, the results of examining the linearity between the NDIR and this embodiment are shown in FIG. 9. In the graph shown in FIG. 9, the vertical axis indicates detected amounts of the measured concentrations and the horizontal axis indicates theoretical concentrations. As can be seen from FIG. 9, the NDIR is difficult to detect the concentration smaller than or equal to 1 ppm, and the detected concentration of the NDIR has a large variance. On the other hand, in this embodiment, even though the concentration is 1 ppm or less, the concentration is detected without any variation same as the concentration of 1 ppm or more.

Figure 10:
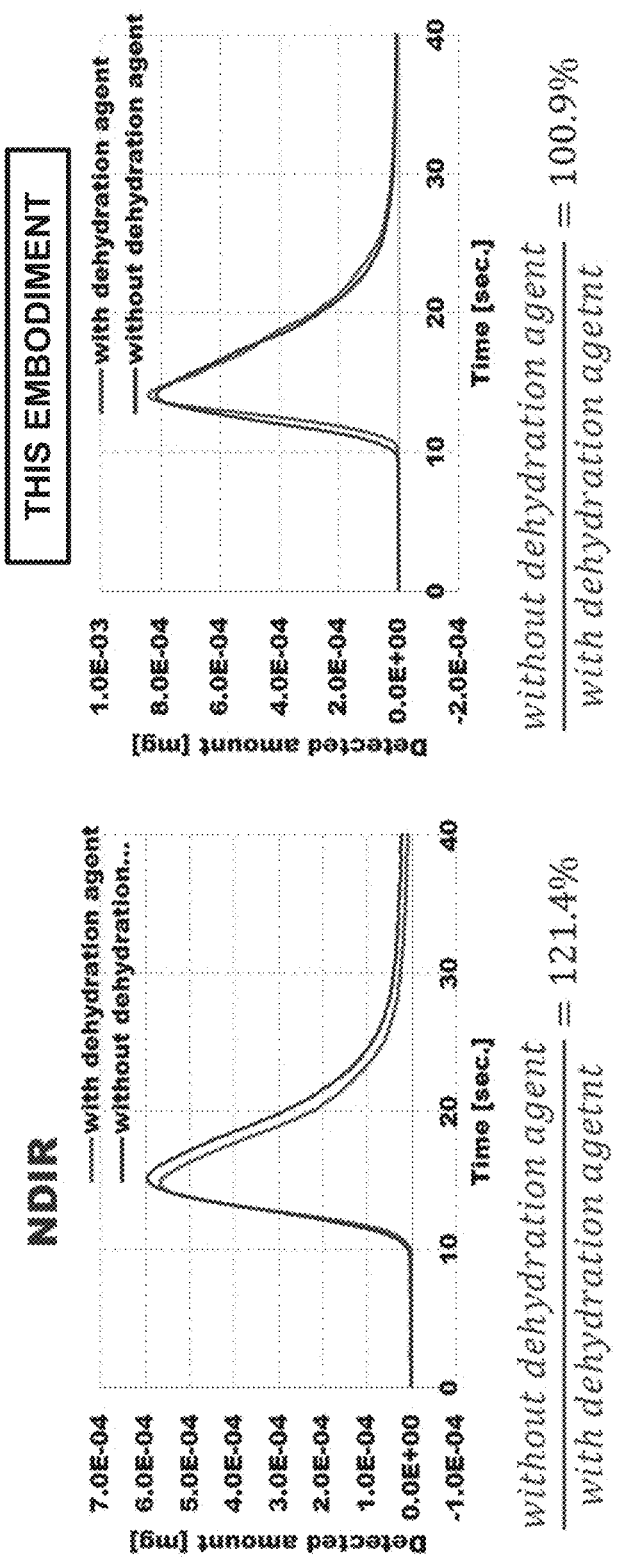
FIG. 10 A diagram showing measurement results of $SO_2$ concentration with and without a dehumidifier in the conventional metal analyzer and the sample analyzing apparatus of the present claimed invention.

Furthermore, FIG. 10 shows the measurement results of $SO_2$ concentration with and without the dehumidifier in the NDIR and in this embodiment. The ratio of the measurement result in case of installing the dehumidifier to the measurement result in case of not installing the dehumidifier ("the $SO_2$ concentration without dehumidifier"/"the $SO_2$ concentration with dehumidifier") in the NDIR was 121.4%, while the ratio was 100.9% in this embodiment. This shows that the interference influence of water was removed without installing a dehumidifier in this embodiment.

Effect of the First Embodiment

In accordance with the sample analyzing apparatus 100 having the above arrangement, since the gas analysis section 3 comprises the laser light source 12 that irradiates the gas with the laser light and the photodetector 13 that detects the intensity of the sample light as being the laser light that has transmitted through the gas, there is no need of installing a wavelength selective filter in front of the detector 13 by irradiating the laser light with the oscillation wavelength tailored to the component to be measured so that it is possible to prevent the light intensity from being reduced by the wavelength selective filter and to increase the signal-to-noise ratio. As a result of this, it is possible to analyze the component to be measured reliably. In addition, since the laser light source 12 is used, the maintenance frequency can be reduced. Thus, in accordance with this embodiment, it is possible to reliably analyze the component to be measured while reducing the frequency of maintenance in the sample analyzing apparatus 100.

In addition, in accordance with this embodiment, since the wavelength modulation spectroscopy (WMS) that uses the intensity related signals obtained by emitting the modulated light modulated at a predetermined modulation frequency calculates the representative value that depends on the concentration of the component to be measured from the intensity related signal relating to the intensity of the sample light, and calculates the concentration of the component to be measured by using the representative value, it is possible to reliably analyze the component to be measured contained in the solid sample (W), while eliminating the need for spectral calculation processing for concentration quantification, which is necessary in a conventional WMS. Concretely, since this embodiment calculates each of the correlation values $S_i$ between the logarithmic intensity L(t), which is the intensity related signal relating to the intensity of the sample light and the plurality of the characteristic signals $F_i(t)$ with respect to the logarithmic intensity L(t), and calculates the concentration of the component to be measured by using the calculated plurality of the correlation values $S_i$, the characteristics of the absorption signal can be captured with dramatically fewer variables without converting the absorption signal to the absorption spectrum so that it is possible to measure the concentration of the component to be measured with simple operations without a complicated spectrum calculation processing. For example, several hundreds are required as the number of data points used in general spectrum fitting, however, in the present claimed invention, the concentration can be calculated with the same accuracy using at most a few to several dozen correlation values. As a result of this, the load of arithmetic processing can be dramatically reduced, and an advanced arithmetic processing unit is no longer necessary, which reduces the cost and downsized the sample analyzing apparatus 100.

In addition, since the sample analyzing apparatus 100 of this embodiment does not use the ultraviolet fluorescence method, there is no need of using a UV light source, and the maintenance of frequent replacement of the UV light source can be eliminated.

Furthermore, since the sample analyzing apparatus 100 of this embodiment can analyze the component to be measured without using an NDIR analyzer, it is possible to eliminate the need for a dehydrating agent so that the maintenance of periodically replacing the dehydrating agent can be omitted. In addition, since the dehydrating agent can be eliminated, the arrangement of the sample analyzing apparatus 100 can be simplified. In other words, the gas flow channel 6 of this embodiment can be configured without a dehydrating agent.

Second Embodiment

The sample analyzing apparatus 100 of a second embodiment of the present claimed invention will be described below with reference to drawings.

The sample analyzing apparatus 100 of the second embodiment differs from the above-mentioned first embodiment in the arrangement of the signal processing unit 14. The other arrangement is the same as that of the first embodiment, and an explanation is omitted in the following.

Figure 11:
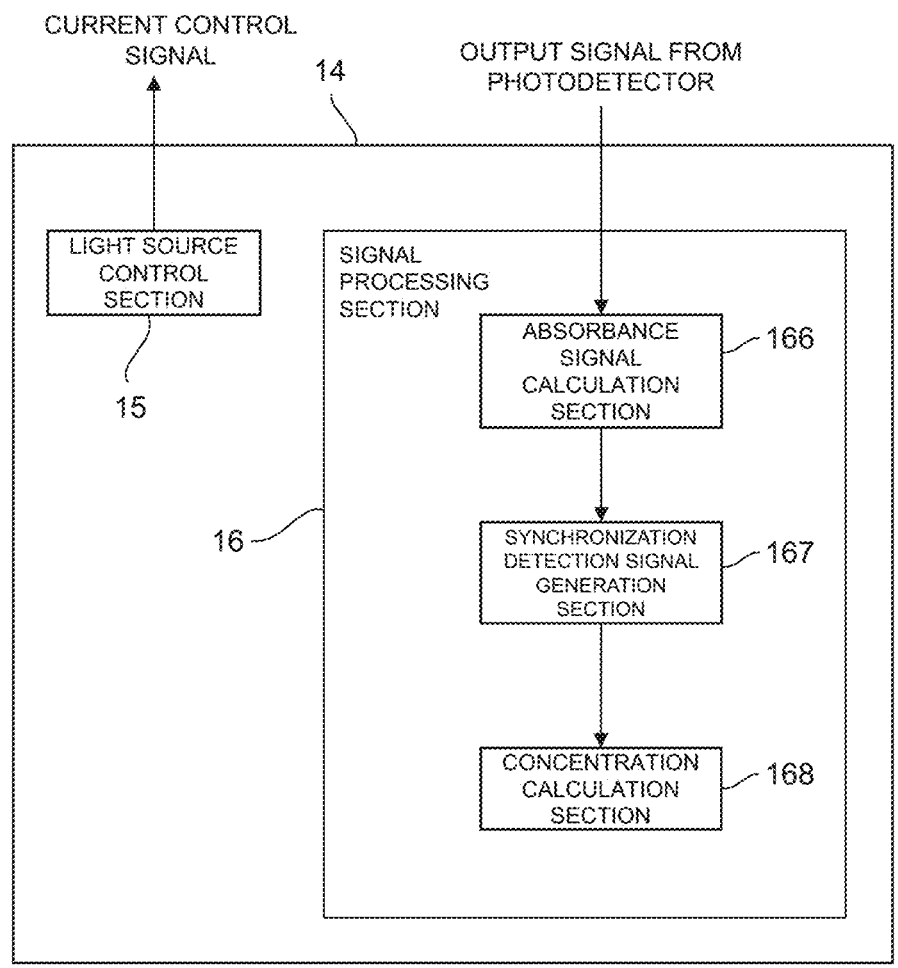
FIG. 11 A functional block diagram of a signal processing unit in accordance with a second embodiment.

A signal processing unit 14 comprises an analog electric circuit consisting of a buffer, an amplifier or the like, a digital electric circuit consisting of a CPU, a memory or the like, and an AD converter and a DA converter which mediate between the analog electric circuit and the digital electric circuit. As shown in FIG. 11, the signal processing unit 14 produces functions as the light source control section 15 that controls the output of the semiconductor laser 12, and the signal processing section 16 that receives the output signal from the photodetector 13 and that calculates the concentration of the component to be measured by processing the value of the output signal by cooperating the CPU and its peripheral devices based on predetermined programs stored in a predetermined area of the memory.

Each section will be described in detail below.

The light source control section 15 controls a current source (or a voltage source) of the semiconductor laser 12 by outputting a current (or a voltage) control signal, which causes a driving current (or a driving voltage) to vary at a predetermined frequency and, in turn, modulates the oscillation wavelength of the laser light output from the semiconductor laser 12 at the above-mentioned predetermined frequency.

Figure 12:
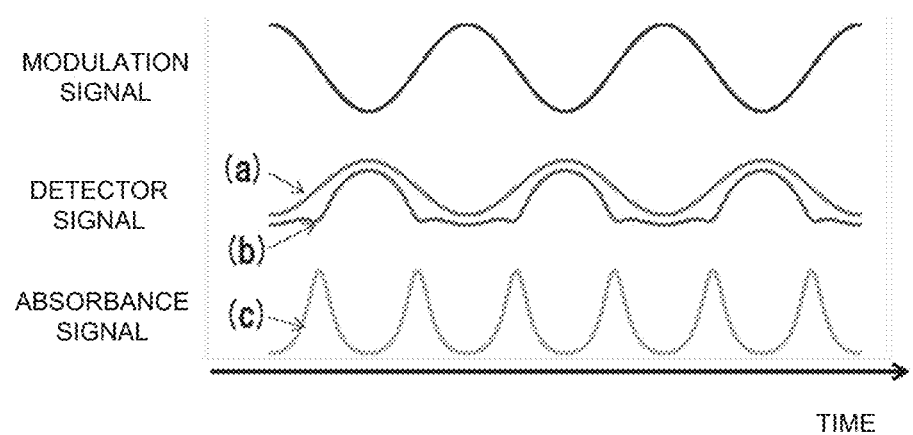
FIG. 12 A time series graph showing an example of measurement results of a modulation signal, an output signal of a photodetector and an absorbance signal in accordance with the second embodiment.

In this embodiment, the light source control section 15 changes the driving current in a sinusoidal state and modulates the oscillation frequency in a sinusoidal state (see the modulation signal in FIG. 12). In addition, the oscillation wavelength of the laser light is modulated around the peak of the optical absorption spectrum of the component to be measured, as shown in FIG. 4.

The signal processing section 16 comprises an absorbance signal calculation section 166, a synchronization detection signal generation section (a first calculation section) 167 and a concentration calculation section (a second calculation section) 168 or the like.

The absorbance signal calculation section 166 calculates the logarithm (hereinafter also referred to as an intensity ratio logarithm) of the ratio of the light intensity of the laser light (hereinafter also referred to as a transmitted light) transmitted through the cell 11 into which the sample gas is enclosed and optical absorption by the component to be measured in the cell occurs and the light intensity of the laser light (hereinafter also referred to as the reference light) transmitted through the cell 11 when optical absorption is practically zero).

More specifically explained, both the light intensity of the transmitted light and the light intensity of the reference light are measured by the photodetector 13, and each of the measurement result data is stored in a predetermined area of the memory. The absorbance signal calculation section 166 calculates the intensity ratio logarithm (hereinafter also referred to as an absorbance signal) by referring to the measurement result data.

The former measurement (hereinafter also referred to as the sample measurement) is, of course, performed for each sample gas. The latter measurement (hereinafter also referred to as the reference measurement) may be performed either before or after the sample measurement, or may be performed at an appropriate timing, for example, only once, and the result may be stored in the memory and commonly used for each sample measurement.

In this embodiment, in order to make the optical absorption practically zero, the cell 11 is enclosed with a zero gas, for example, $N_2$ gas, which makes the optical absorption practically zero in the wavelength band where the optical absorption of the component to be measured is observed, however, other gas may be enclosed or inside of the cell 11 may be vacuumed.

The synchronization detection signal generation section 167 generates a synchronous detection signal by performing lock-in detection on the absorbance signal calculated by the absorbance signal calculation section 66 with a sinusoidal signal (a reference signal) having a frequency of n times (n is an integer of one or more) the modulation frequency and by extracting the frequency components of the reference signal from the absorbance signal. The lock-in detection may be performed by digital operation or by analog circuitry. In addition, the frequency components may be extracted not only by lock-in detection but also by using a method such as the Fourier series expansion.

The concentration calculation section 168 calculates the concentration of the component to be measured based on the synchronous detection results by the synchronous detection signal generation section 167.

Next, an example of the operation of the sample analyzing apparatus 100 will be described, together with a detailed explanation of each of the above sections.

First, the light source control section 15 controls the semiconductor laser 12 as described above and modulates the wavelength of the laser light at the above-mentioned modulation frequency and around the peak of the absorption spectrum of the component to be measured.

Next, when the zero gas is enclosed into the cell 11 by an operator or automatically, the absorbance signal calculation section 166 detects that the zero gas is enclosed and performs a reference measurement.

Concretely, the output signal is received from the photodetector 13 in a state that the zero gas is enclosed in the cell 11, and the value of the output signal is stored in the measurement result data storage section. The value of the output signal received from the photodetector 13 in this reference measurement, namely, the reference light intensity, is shown in a time series graph in FIG. 12(a). More specifically, only the change in the optical output due to the modulation of the driving current (voltage) of the laser is expressed in the output signal of the photodetector 13.

Then, when the sample gas is enclosed into the cell 11 by an operator or automatically, the absorbance signal calculation section 166 performs the sample measurement. Concretely, the absorbance signal calculation section 166 receives the output signal from the photodetector 13 in a state that the sample gas is enclosed in the cell 11 and stores the value of the output signal in a predetermined area of the memory. The value of the output signal from the photodetector 13 in this sample measurement, namely, the transmitted light intensity is shown in a time series graph in FIG. 12(b). It can be seen that a peak due to absorption appears at every half cycle of the modulation.

Next, the absorbance signal calculation section 166 synchronizes each of the measurement data with the modulation cycle and calculates the intensity ratio logarithm (the absorbance signal) of the light intensity of the transmitted light to the light intensity of the reference light. Concretely, the following equation (expression 4) and equal calculations are performed.

$$A(t) = -\ln\left(\frac{D_m(t)}{D_z(t)}\right) \quad \text{[Expression 4]}$$

Here, $D_m(t)$ is the transmitted light intensity, $D_z(t)$ is the reference light intensity, and $A(t)$ is the intensity ratio logarithm (the absorbance signal). The absorbance signal is shown in a graph in FIG. 12(c) when time is plotted in a horizontal axis.

At this time, the logarithm of the ratio of the transmitted light intensity to the reference light intensity may be obtained after calculating the ratio of the transmitted light intensity to the reference light intensity, or the logarithm of the transmitted light intensity and the logarithm of the reference light intensity may be obtained respectively and subtracted.

Next, the synchronization detection signal generation section 167 lock-in detects the absorbance signal with the reference signal having twice the frequency of the modulation frequency, more specifically, extracts the frequency component of twice the modulation frequency, and stores the synchronous detection signal (hereinafter also referred to as a lock-in data) in a predetermined area of the memory.

The value of this lock-in data becomes a value proportional to the concentration of the component to be measured, and the concentration calculation section 168 calculates a concentration indication value indicating the concentration of the component to be measured based on the value of this lock-in data.

Therefore, in accordance with this arrangement, even if the laser light intensity fluctuates due to some factor, only a certain offset is added to the above-mentioned intensity ratio logarithm, and the waveform does not change. As a result of this, the value of each of the frequency components calculated by the lock-in detection does not change, and the concentration indication value does not change so that a highly accurate measurement can be expected.

The reason for this will be explained in detail as follows.

In general, when the absorbance signal $A(t)$ is expanded by a Fourier series, it is expressed by the following equation (expression 5).

Note that $a_n$ in the equation (expression 5) is a value proportional to the concentration of the component to be measured, and the concentration calculation section 168 calculates the concentration indication value indicating the concentration of the component to be measured based on this value an.

$$A(t) = a_0 + \sum_{n=1}^{\infty} a_n \cos(2\pi n f_m t + \phi_n) \quad \text{[Expression 5]}$$

Here, $f_m$ is the modulation frequency, and n is a multiple number of the modulation frequency.

On the other hand, $A(t)$ is also expressed as the above-mentioned equation (expression 1).

Next, in case that the laser light intensity fluctuates by a factor of $\alpha$ during the measurement due to some factor, the absorbance signal $A'(t)$ is expressed as the following equation (expression 6).

$$A'(t) = -\ln\left(\frac{\alpha D_m(t)}{D_z(t)}\right) = -\ln\left(\frac{D_m(t)}{D_z(t)}\right) - \ln(\alpha) = A(t) - \ln(\alpha) \quad \text{[Expression 6]}$$

As is clear from this equation (expression 6), A'(t) is only a constant value wherein $-\ln(\alpha)$ is added to the absorbance signal A(t) in case of no change in the laser light intensity, and the value an of each of the frequency components does not change even if the laser light intensity changes.

Accordingly, the concentration indication value, which is determined based on the value of the frequency component twice the modulation frequency, will not be influenced.

The above is an example of the operation of the sample analyzing apparatus 100 in case that the sample gas does not contain any interference components other than the component to be measured.

Next, explained is an example of the operation of the sample analyzing apparatus 100 when the sample gas contains one or more interference components (for example, $H_2O$) having the optical absorption at the peak optical absorption wavelength of the component to be measured.

First, the principle will be explained.

Since the optical absorption spectra of the component to be measured and the interference component have different shapes, the absorbance signal has a different waveform in case that each of the components exists alone and the ratio of each of the frequency components is different (linearly independent). By making use of this, it is possible to obtain the concentration of the component to be measured, corrected for interference influences, by solving simultaneous equations using the relationship between each of the frequency components of the measured absorbance signal and each of the frequency components of the absorbance signal of the component to be measured obtained in advance and each of the frequency components of the absorbance signal of the interference component.

In case that the component to be measured and the interference component exist alone, if each of the absorbance signals per unit concentration is $A_m(t)$ and $A_i(t)$ respectively, and each of the frequency components of the absorbance signals is $a_{nm}$ and $a_{ni}$, the following equations (expressions 7 and 8) are established.

$$A_m(t) = a_{0m} + \sum_{n=1}^{\infty} a_{nm}\cos(2\pi n f_m t + \phi_n)$$ [Expression 7]

$$A_i(t) = a_{0i} + \sum_{n=1}^{\infty} a_{ni}\cos(2\pi n f_m t + \phi_n)$$ [Expression 8]

In case that the concentrations of the component to be measured and the interference component exist at $C_m$ and $C_i$, respectively, the absorbance signal value A(t) is expressed by the following equation (expression 9) due to the linearity of each of the absorbance.

$$A(t) = C_m A_m(t) + C_i A_i(t)$$ [Expression 9]

$$= C_m\left(a_{0m} + \sum_{n=1}^{\infty} a_{nm}\cos(2\pi n f_m t + \phi_n)\right) +$$

$$C_i\left(a_{0i} + \sum_{n=1}^{\infty} a_{ni}\cos(2\pi n f_m t + \phi_n)\right)$$

$$= a_{0m}C_m + a_{0i}C_i + \sum_{n=1}^{\infty}(a_{nm}C_m + a_{ni}C_i)\cos(2\pi n f_m t + \phi_n)$$

If the frequency components of $f_m$ and $2f_m$ of A(t) are $a_1$ and $a_2$ respectively, the following simultaneous equations (expression 10) are established from the above equation (expression 9).

$$a_{1m}C_m + a_{1i}C_i = a_1$$ [Expression 10]

$$a_{2m}C_m + a_{2i}C_i = a_2$$

Since each of the frequency components $a_{nm}$ and $a_{ni}$ (n is a natural number, where n=1, 2) can be obtained in advance by flowing each of the span gasses in case that the component to be measured and the interference component each exist alone, it is possible to determine the concentration $C_m$ of the gas to be measured with the interference influence removed by means of a simple and reliable operation of solving the simultaneous equations in the above equation (expression 10).

The sample analyzing apparatus 100 operates based on the above-described principle.

More specifically, the sample analyzing apparatus 100 in this embodiment stores the frequency components $a_{1m}$, $a_{2m}$, $a_{1i}$, $a_{2i}$ of the respective absorbance signals in a predetermined area of the memory in case that the component to be measured and the interference component exist alone, for example, by flowing the span gas in advance and previously measuring the frequency components $a_{1m}$, $a_{2m}$, $a_{1i}$, $a_{2i}$. Concretely, similar to the former example, the frequency components $a_{1m}$, $a_{2m}$, $a_{1i}$, and $a_{2i}$ are obtained and stored by measuring the light intensity to be measured and the reference light intensity for each of the components to be measured and the interference component, by calculating their intensity ratio logarithm (the absorbance signal), and then by obtaining the frequency components $a_{1m}$, $a_{2m}$, $a_{1i}$, and $a_{2i}$ from this intensity ratio logarithm by lock-in detection. The absorbance signals per unit concentration $A_m(t)$ and $A_i(t)$ may be stored instead of the above-mentioned frequency components, and the frequency components $a_{1m}$, $a_{2m}$, $a_{1i}$, $a_{2i}$ may be calculated from the above equations (expression 7 and expression 8).

Then, the sample analyzing apparatus 100 specifies the component to be measured and the interference component by the input from the operator or other means.

Next, the absorbance signal calculation section 166 calculates the intensity ratio logarithm A(t) according to the equation (expression 4).

Then, the synchronization detection signal generation section 167 conducts lock-in detection on the intensity ratio logarithm with a reference signal having a modulation frequency $f_m$ and a frequency $2f_m$ twice the modulation frequency, extracts each of the frequency components $a_1$ and $a_2$ (lock-in data), and stores them in a predetermined area of the memory.

Then, the concentration calculation section 168 calculates the concentration (or concentration indication value) $C_m$, which indicates the concentration of the gas to be measured with the interference influence removed, by applying the values of the lock-in data $a_1$ and $a_2$ and the values of the frequency components $a_{1m}$, $a_{2m}$, $a_{1i}$, and $a_{2i}$ stored in the memory to the above equation (expression 10), or by conducting a calculation equal to it. At this time, the concentration (or concentration indication) $C_i$ of each of the interference components (or concentration indicating values) may be calculated.

Even in case that it can be assumed that there are more than two interference components, the concentration of the component to be measured, from which the interference influence has been removed, can be determined in the same way by adding higher order frequency components as many as the number of interference components, and solving simultaneous equations with the same number of elements as the number of component types.

More specifically, in case that there are n gas types, including the component to be measured and the interference component, if the frequency component of $i*f_m$ of the kth gas type is $a_{ik}$ and the concentration of the kth gas type is $C_k$, the following equations (expression 11) are established.

$$a_{11}C_1 + a_{12}C_2 + a_{13}C_3 + ... + a_{1n}C_n = a_1$$
$$a_{21}C_1 + a_{22}C_2 + a_{23}C_3 + ... + a_{2n}C_n = a_2$$
$$a_{31}C_1 + a_{32}C_2 + a_{33}C_3 + ... + a_{3n}C_n = a_3$$
$$\vdots$$
$$a_{n1}C_1 + a_{n2}C_2 + a_{n3}C_3 + ... + a_{nn}C_n = a_n$$

[Expression 11]

By solving the simultaneous equations with n unknown numbers represented by these equations (expression 11), it is possible to determine the concentration of each gas of the component to be measured and the interference component.

In addition, the concentration of each of the gases may be determined using the least-squares method by adding harmonic components whose order is higher than n to form simultaneous equations with the number of unknown larger than the number of gas types. In accordance with this, it is possible to determine the concentration with less error against measurement noise.

Effect of the Second Embodiment

In accordance with the sample analyzing apparatus 100 of this embodiment, since the gas analysis section 3 comprises the laser light source 12 that irradiates the gas with the laser light and the photodetector 13 that detects the intensity of the sample light as being the laser light that has transmitted through the gas, it is possible to irradiate the laser light of the oscillation wavelength tailored to the component to be measured so that there is no need of installing a wavelength selective filter in front of the photodetector 13. Then, it is possible to prevent the light intensity from being reduced due to the wavelength selective filter and to increase the signal-to-noise ratio. As a result of this, it is possible to measure the component to be measured reliably. In addition, since the laser light source 12 is used, it is possible to reduce the maintenance frequency. In accordance with this embodiment, it is possible to reliably analyze the component to be measured while reducing the frequency of maintenance in the sample analyzing apparatus 100.

In addition, in accordance with this embodiment, in the wavelength modulation spectroscopy (WMS) that uses intensity related signals obtained by emitting the modulated light modulated at a predetermined modulation frequency, since a representative value that depends on the concentration of the component to be measured is calculated based on the intensity related signal relating to the intensity of the sample light and the concentration of the component to be measured is calculated using the representative value, it is possible to eliminate the need for spectral calculation processing for concentration quantification, which is necessary in a conventional WMS, and to reliably analyze the component to be measured contained in the solid sample (W). Concretely, in this embodiment, since the frequency component of n times the modulation frequency is extracted from the absorbance signal A(t) and the concentration of the component to be measured is calculated by using the extracted frequency component, it is possible to measure the concentration of the component to be measured with a simple calculation without any complicated spectral calculation processing. As a result of this, an advanced arithmetic processing unit is no longer necessary so that it is possible to reduce the cost of the sample analyzing apparatus 100 as well as to downsize the sample analyzing apparatus 100.

In addition, in accordance with the sample analyzing apparatus 100 of this embodiment, since the ultraviolet fluorescence method is not used, there is no need of using an ultraviolet light source so that it is possible to eliminate the maintenance of frequent replacement of the ultraviolet light source.

Furthermore, in accordance with the sample analyzing apparatus 100 of this embodiment, since the component to be measured can be analyzed without using an NDIR analyzer, it is possible to eliminate the need for a dehydrating agent and to eliminate the maintenance of periodically replacing the dehydrating agent. In addition, since the dehydrating agent is unnecessary, it is possible to simplify the arrangement of the sample analyzing apparatus 100. In other words, the gas flow channel 6 of this sample analyzing apparatus 100 can be configured without a dehydrating agent.

Other Modified Embodiments

The present claimed invention is not limited to the above-mentioned embodiments.

For example, the logarithmic calculation section 161 of the above-mentioned first embodiment conducts the logarithmic calculation on the light intensity signal of the photodetector 13, however, the logarithmic calculation section 161 may calculate the logarithm (so-called absorbance) of the ratio of the intensity of the sample light to the intensity of the reference light by using the light intensity signal of the photodetector 13. In this case, the logarithmic calculation section 161 may calculate the absorbance by calculating the logarithm of the intensity of the sample light and the logarithm of the intensity of the reference light and then by subtracting the calculated logarithm of the intensity of the reference light from the logarithm of the intensity of the sample light. The logarithmic calculation section 161 may obtain the ratio of the intensity of the sample light to the intensity of the reference light and calculate the logarithm of the ratio of the intensity of the sample light to the intensity of the reference light.

In addition, the correlation value calculation section 162 of the above-mentioned first embodiment calculates the correlation value between the intensity related signal and the characteristic signal. However, the correlation value calculation section 162 may calculate the inner product value between the intensity related signal and the characteristic signal.

In addition, in the above-mentioned first embodiment, the storage section 163 stores the alone correlation value corrected by using the reference correlation value. However, the storage section 163 may store an alone correlation value before being corrected, and the concentration calculation section 164 may calculate the alone correlation value corrected to convert to per unit concentration by subtracting the reference correlation value from the alone correlation value before being corrected.

The plurality of the characteristic signals are not limited to the above-mentioned first embodiment, and it may be functions that differ from each other. In addition, a function indicating the light intensity, the logarithmic intensity or the waveform (actual measurement spectrum) of the absorbance obtained by flowing a span gas whose concentration is known may be used as the characteristic signal. In case of measuring the concentration of one component to be measured, at least one characteristic signal will do.

Figure 13:
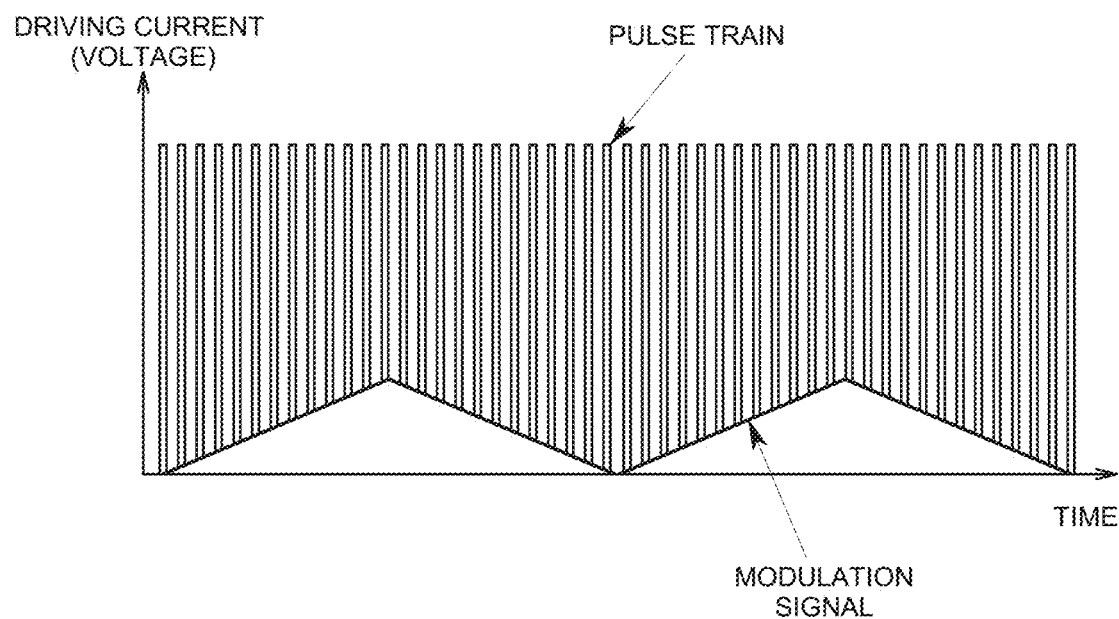
FIG. 13 A diagram showing a driving current (voltage) and a modulation signal in pseudo-continuous oscillation.

The light source control section 15 in each of the above-mentioned embodiments makes the semiconductor laser oscillate continuously (CW), however, it may also make it oscillate pseudo-continuously (pseudo-CW), as shown in FIG. 13. In this case, the light source control section 15 controls the current source (or voltage source) of each of the semiconductor lasers 12 by outputting a current (or voltage) control signal so as to make the driving current (or drive voltage) of the current source (or voltage source) bigger than or equal to a predetermined threshold value for pulse oscillation. Concretely, the light source control section 15 causes pseudo-continuous oscillation with pulse oscillation of a predetermined pulse width (for example, 10 to 50 ns, duty ratio 5%) repeated at a predetermined period (for example, 1 to 5 MHz). Then, the light source control section 15 sweeps the oscillation wavelength of the laser light by generating a temperature change by changing the driving current (drive voltage) of the current source (or voltage source) at a predetermined frequency at a value that is less than the threshold value for the above-mentioned pulse oscillation. The modulation signal that modulates the driving current changes in a form of a triangular wave, a saw wave or a sine wave, and the frequency of the modulation signal is, for example, 1 to 100 Hz.

Figure 14:
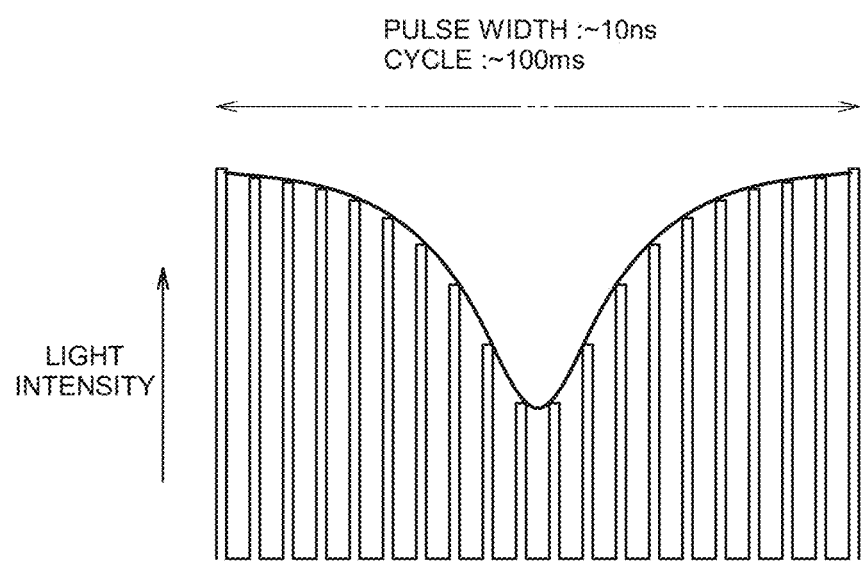
FIG. 14 A schematic diagram showing a measurement principle in pseudo-continuous oscillation.

The light intensity signal obtained by the photodetector 13 with pseudo-continuous oscillating the semiconductor laser is shown in FIG. 14. In this way, the absorption spectrum can be obtained for the entire pulse train. The pseudo-continuous oscillation has lower power consumption of the light source and easier exhaust heat treatment compared to continuous oscillation and also extends the life of the light source.

Figure 15:
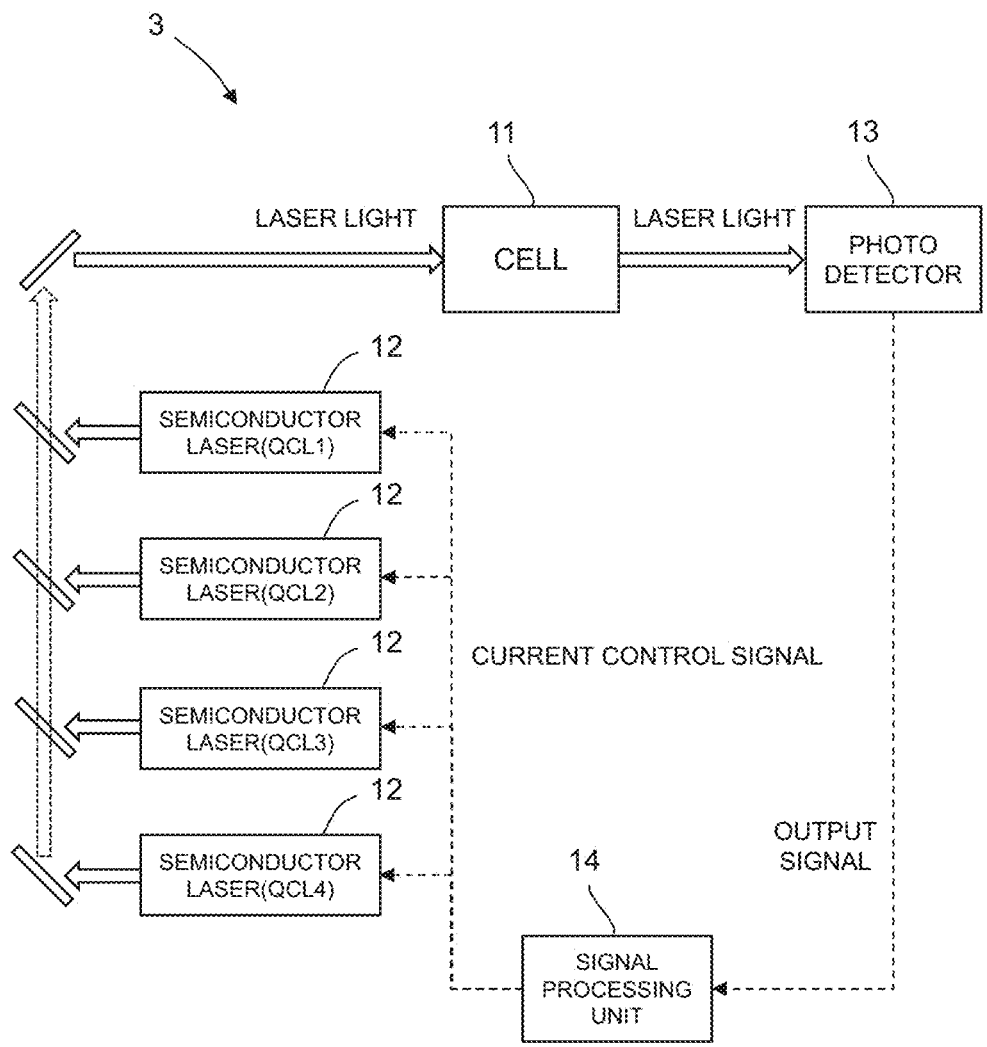
FIG. 15 An overall schematic diagram of the gas analysis section in accordance with a modified embodiment.
Figure 16:
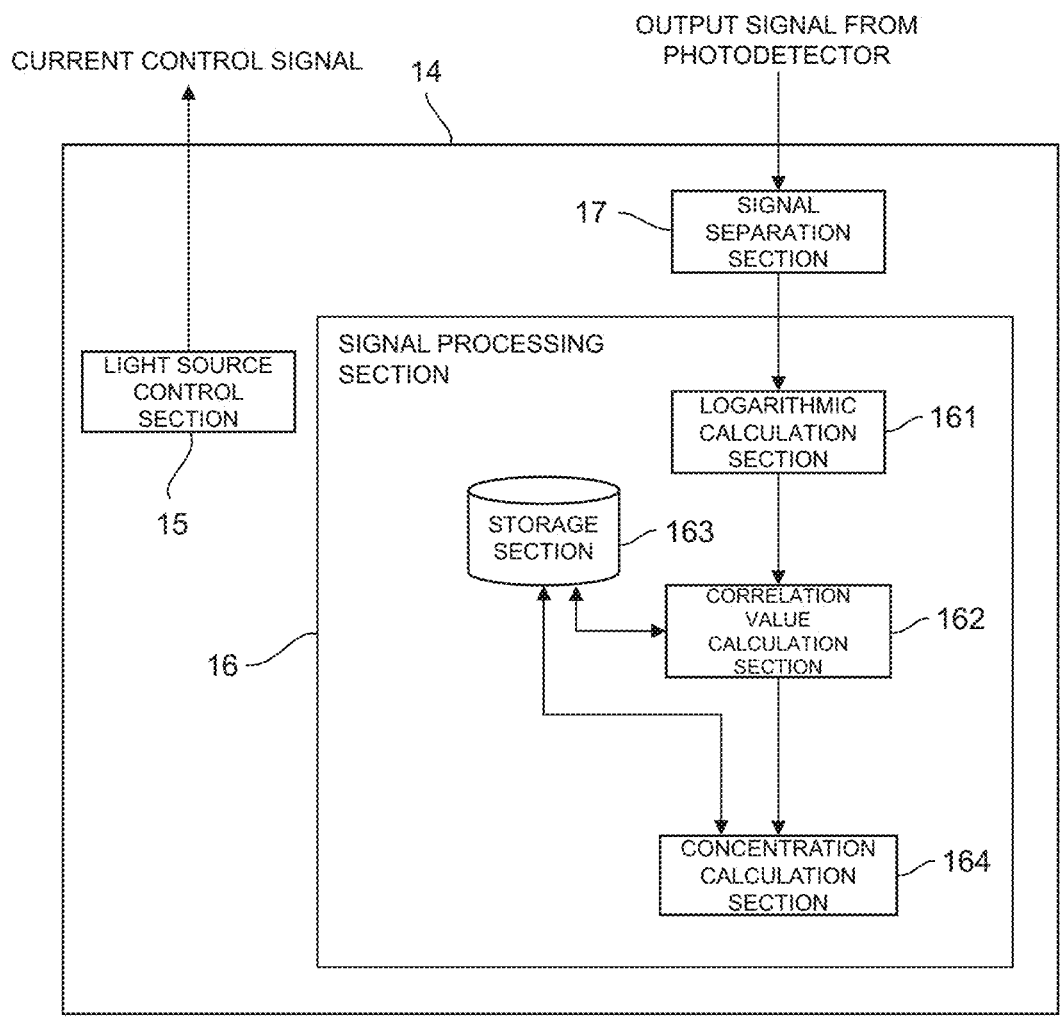
FIG. 16 A functional block diagram of the signal processing unit in accordance with the modified embodiment.

In addition, the gas analysis section 3 may comprise a plurality of the semiconductor lasers 12 as the light source to irradiate the cell 11 with the laser light, as shown in FIG. 15. Then the signal processing unit 14, as shown in FIG. 16, produces functions as the light source control section 15 that controls the output of the semiconductor lasers 12, the signal separation section 17 that separates the signal of each of the semiconductor lasers 12 from the light intensity signal obtained by the photodetector 13, and the signal processing section 16 that receives the signals of each of the semiconductor lasers separated by the signal separation section 17 and that calculates the concentration of the component to be measured by processing the values of the received signals.

The light source control section 15 causes each of the plurality of the semiconductor lasers 12 to pulse oscillate and modulates the oscillation wavelength of the laser light at a predetermined frequency. In addition, the light source control section 15 controls the plurality of the semiconductor lasers 12 so that each of the semiconductor lasers 12 has an oscillation wavelength corresponding to each of the components to be measured which differ each other and the semiconductor lasers 12 pulse oscillate with the same oscillation cycle as each other and the oscillation timing differing from each other.

Concretely, the light source control section 15 controls the current source (or voltage source) of each of the semiconductor lasers 12 by outputting the current (or voltage) control signal. As shown in FIG. 13, the light source control section 15 of this embodiment causes each of the semiconductor lasers 12 to oscillate in pseudo-continuous oscillation (pseudo-CW) with pulse oscillation of a predetermined pulse width (for example, 10 to 100 ns, duty ratio 5%) repeated at a predetermined cycle (for example, 0.5 to 5 MHz).

In addition, as shown in FIG. 13, the light source control section 15 sweeps the oscillation wavelength of the laser light by generating a temperature change by changing the driving current (or driving voltage) of the current source (or voltage source) at a predetermined frequency. As shown in FIG. 3, the oscillation wavelength of the laser light in each of the semiconductor lasers is modulated around the peak of the optical absorption spectrum of the component to be measured. The modulation signal that modulates the driving current changes in a form of a triangular wave, a saw wave or a sine wave, and the frequency of the modulation signal is, for example, 100 Hz to 10 kHz. FIG. 13 shows an example of the modulation signal changing in the triangular wave form.

The light intensity signal obtained by the photodetector 13 by pseudo-continuous oscillating one semiconductor laser 12 is shown in FIG. 14. In this way, it is possible to obtain the absorption signal for the entire pulse train.

Figure 17:
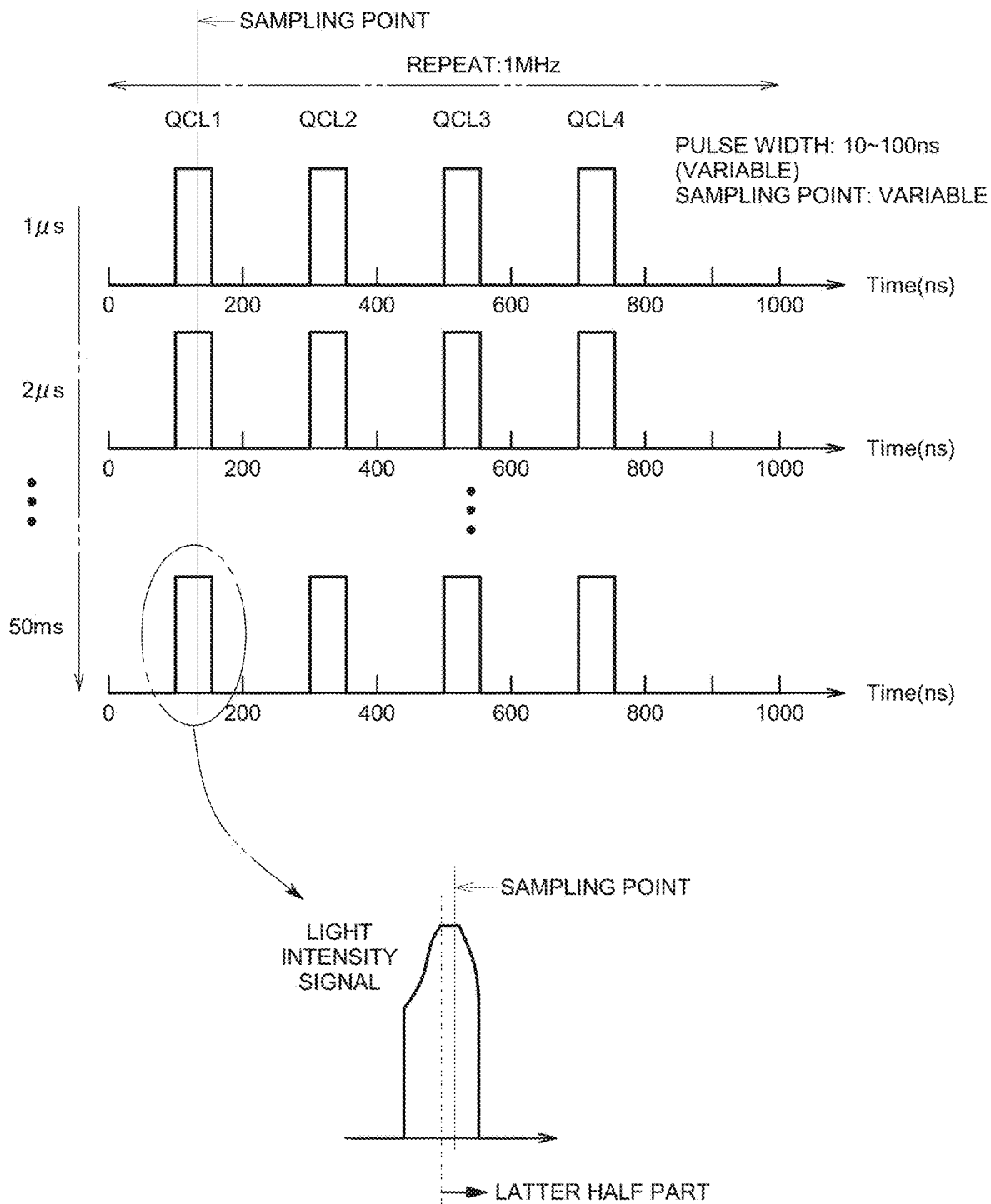
FIG. 17 A schematic diagram showing an example of pulse oscillation timings and light intensity signals of a plurality of semiconductor lasers in accordance with the modified embodiment.

In addition, the light source control section 15 controls the plurality of semiconductor lasers 12 to pulse oscillate at different timings from each other. Concretely, as shown in FIG. 17, the plurality of semiconductor lasers 12 sequentially pulse oscillate, and one pulse of the other semiconductor laser 12 is included within one cycle of the pulse oscillation in one semiconductor laser 12. In other words, one pulse of the other semiconductor laser 12 is included in the mutually adjacent pulse of one semiconductor laser 12. In this case, the pulses of the plurality of semiconductor lasers 12 are oscillated so as not to overlap each other.

The signal separation section 17 separates the signal of each of the plurality of the semiconductor lasers 12 from the light intensity signal obtained by the photodetector 13. The signal separation section 17 of this embodiment has a plurality of sample hold circuits that are provided corresponding to each of the plurality of the semiconductor lasers 12 and an AD converter that digitally converts the light intensity signal separated by the sample hold circuits. The sample hold circuits and the AD converter may be one that is common to the plurality of the semiconductor lasers 12.

The sample hold circuit separates and holds the signal of the corresponding semiconductor laser 12 from the light intensity signal of the photodetector 13 at a timing synchronized with the timing of pulse oscillation of the semiconductor laser 12 by a sampling signal synchronized with the current (or voltage) control signal of the corresponding semiconductor laser 12. The sample hold circuit is configured to separate and hold the signal corresponding to the latter half part of the pulse oscillation of the semiconductor laser 12. The multiple signals become a single optical absorption signal by collecting the multiple signals of each of the semiconductor lasers 12 separated by the signal separation section 17 so that it is possible to obtain the optical absorption signal whose wavelength resolution is better than that of the wavelength of the optical absorption signal that is obtained in case of pseudo-continuous oscillation of a single semiconductor laser 12. In this embodiment, since the position of the absorption change in the pulse varies according to the modulation signal, it is possible to reproduce the waveform by sampling the signal at the same timing as that of the pulse oscillation. In addition, since the signal corresponding to a part of the pulse oscillation is separated by the sample hold circuit, the AD converter may be a converter having a slow processing speed. The plurality of the optical absorption signals obtained for each of the semiconductor lasers 12 may be used in a time-averaged manner.

The signal processing section 16 calculates the concentration of the component to be measured corresponding to each of the semiconductor lasers 12 by using the absorption signals of each of the semiconductor lasers 12 separated by the signal separation section 17. The calculation of the concentration of the component to be measured by the signal processing section 16 is the same as that in the above embodiment.

Each of the functions of the gas analysis section of the first and second embodiments produces functions as the first calculation section that calculates the representative value that depends on the concentration of the component to be measured by using the intensity related signal relating to the intensity of the sample light and the characteristic signal that has a predetermined correlation to the intensity related signal, and the second calculation section the calculates the concentration of the component to be measured by using the representative value obtained by the first calculation section, however, other calculation method may be used.

The light source is not limited to the semiconductor laser and may be any other type of laser as long as it is a single-wavelength light source with a half-value width that is sufficient to secure the measurement accuracy and that is capable of wavelength modulation. In addition, the light source may also be intensity modulated.

Figure 18:
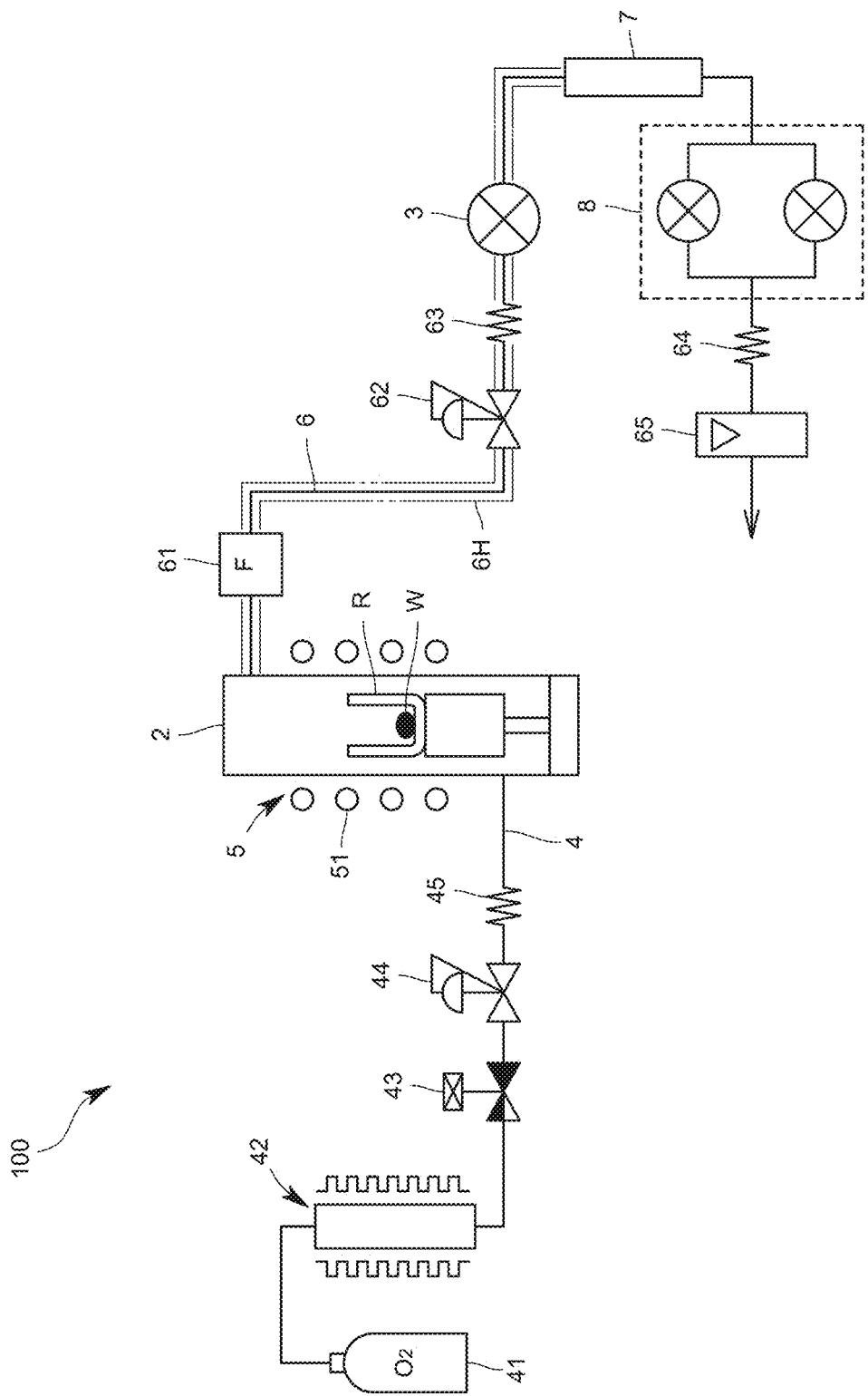
FIG. 18 An overall schematic diagram of the sample analyzing apparatus in accordance with a modified embodiment.

In each of the above-mentioned embodiments, a single gas analysis section 3 is arranged in the gas flow channel 6, however as shown in FIG. 18, an NDIR analyzer 8 may also be arranged in addition to the gas analysis section 3. In this case, a dehumidifier 7 is arranged in a downstream side of the gas analysis section 3 in the gas flow channel 6, and the NDIR analyzer 8 is arranged in the downstream side of the dehumidifier 7. The dehumidifier 7 may also be arranged in the upstream side of the gas analysis section 3. In addition, the gas flow channel 6 may also be configured to be branched into a first flow channel to supply the gas to the gas analysis section 3 and a second flow channel to supply the gas to the NDIR analyzer 8. In accordance with this arrangement wherein the gas analysis section 3 and the NDIR analyzer 8 are used together, it is possible to expand the measurement range. For example, if the measurement range of the gas analysis section 3 is 200 ppm or less, and the measurement range of the NDIR analyzer 8 is 200 ppm to 5%, the measurement results of the gas analysis section 3 can be used in the low concentration area, and the measurement results of the NDIR analyzer 8 can be used in the high concentration area.

If the gas analysis section 3 locates in the upstream side of the NDIR analyzer 8, the cell 11 of the gas analysis section 3 acts like a buffer tank, which may dull the signal and reduce the sensitivity. For this reason, in case of determining the sensitivity of the NDIR analyzer 8, the arrangement can be used in which the NDIR analyzer 8 is arranged in the upstream side and the gas analysis section 3 is arranged in the downstream side in the gas flow channel 6. In accordance with this arrangement, it is possible to make use of the sensitivity of the NDIR analyzer 8 to conduct the analysis.

The heating furnace 2 in each of the above-mentioned embodiments is of the high-frequency induction furnace type, however, the heating furnace 2 may also be of the electric resistance furnace type. In addition, the heating furnace 2 may also be an infrared gold image furnace that heats the sample by using an infrared lamp. Furthermore, the heating furnace 2 may also use a method in which a graphite crucible containing a solid sample is sandwiched between a lower electrode and an upper electrode, and the solid sample is heated by passing an electric current through the graphite crucible. In addition, the present claimed invention is also applicable to a unit having a gas generating section that generates a gas by burning the solid sample housed in the crucible.

The sample holding body in each of the above-mentioned embodiments is the container (R) such as the crucible that houses the sample (W), however, it may be an arrangement that holds the sample (W) without housing the sample (W). The sample (W) is heated by placing the sample holding body that holds the sample (W) in the heating furnace 2.

In addition, the embodiments may be variously modified or combined without departing from a spirit of the present claimed invention.

POSSIBLE APPLICATIONS IN INDUSTRY

In accordance with this invention, it is possible for the sample analyzing apparatus to reliably analyze components to be measured while reducing the frequency of maintenance of the sample analyzing apparatus.

The invention claimed is:

1. A sample analyzing apparatus comprising
a heating furnace that heats a sample held by a sample holding body that holds the sample, and
a gas analysis section that analyzes a target component to be measured contained in a gas containing at least one interference component produced by heating the sample, wherein
the gas analysis section comprises
a laser light source that emits a modulated light whose wavelength is modulated at a predetermined modulation frequency and around a peak of an absorption spectrum of the target component to be measured,
a photodetector that detects an intensity of a sample light as being the modulated light that has transmitted through the gas,
a correlation value calculation section that calculates correlation values between intensity related signals that relate to the intensity of the modulated light detected by the photodetector and a plurality of feature signals from which a predetermined correlation with the intensity related signals is able to be obtained,
a concentration calculation section that calculates concentrations of the target component in the gas produced by heating the sample using the correlation values obtained by the correlation value calculation section, and
a storage section that stores individual correlation values, which are respective correlation values per unit concentration for the target component and for each of a plurality of interference components determined from the respective intensity related signals and the plurality of feature signals, for a case in which the target component and the each of the plurality of interference components are present individually,
wherein the concentration calculation section calculates concentrations of the target component in the gas produced by heating the sample based on sample correlation values, which are obtained by the correlation value calculation portion during analysis of the gas produced by heating the sample, and on the individual correlation values of the target component and the at least one interference component stored in the storage portion.

2. The sample analyzing apparatus that analyses a plurality of the components to be measured contained in the gas and described in claim 1, wherein a plurality of the laser light sources are provided, the plurality of the laser light sources emit the laser light with an oscillation wavelength corresponding to the respectively different target components to be measured.

3. The sample analyzing apparatus described in claim 1, wherein the target component to be measured is at least one of $CO_2$, CO, $SO_2$, $H_2O$, and NOx.

4. The sample analyzing apparatus described in claim 1, further comprising a gas flow channel that connects the heating furnace and the gas analysis section and that introduces the gas from the heating furnace into the gas analysis section without dehydrating the gas using a dehydrating agent.

5. The sample analyzing apparatus described in claim 1, further comprising an analyzer using a non-dispersive infrared absorption method in addition to the gas analysis section.

6. The sample analyzing apparatus described in claim 1, wherein the correlation value calculation section calculates the sample correlation values by subtracting a reference correction value, which is a correlation value between an intensity related signal of a reference light and the feature signals, from a correlation value between the intensity related signal of the sample light and the feature signals.

* * * * *